United States Patent
Giry-Cassan

(10) Patent No.: US 12,470,447 B2
(45) Date of Patent: Nov. 11, 2025

(54) ELECTRONIC CIRCUIT FOR DELIVERING SIGNALS IN QUADRATURE

(71) Applicant: STMicroelectronics France, Montrouge (FR)

(72) Inventor: Florence Giry-Cassan, Corenc (FR)

(73) Assignee: STMicroelectronics France, Montrouge (FR)

(*) Notice: Subject to any disclaimer, the term of this patent is extended or adjusted under 35 U.S.C. 154(b) by 96 days.

(21) Appl. No.: 18/491,212

(22) Filed: Oct. 20, 2023

(65) Prior Publication Data

US 2024/0137254 A1 Apr. 25, 2024
US 2024/0235907 A9 Jul. 11, 2024

(30) Foreign Application Priority Data

Oct. 24, 2022 (FR) ........................ 2211018

(51) Int. Cl.
*H04L 27/227* (2006.01)
*H03B 5/12* (2006.01)

(52) U.S. Cl.
CPC ....... *H04L 27/2273* (2013.01); *H03B 5/1228* (2013.01); *H03B 2200/0078* (2013.01)

(58) Field of Classification Search
CPC .... H04B 1/30; H04B 1/71637; H04B 1/7183; H04B 1/719; H04B 1/40; H04B 1/0475; H04B 1/16; H04B 1/7163; H04B 1/7176; H04B 1/71635; H04B 1/406; H04B 1/707; H04B 1/04; H04B 1/71632; H04B 1/525; H04B 1/7174; H04B 1/28; H04B 2001/6908; H04B 1/69; H04B 1/7172; H04B 1/10; H04B 1/005; H04B 1/1036; H04B 17/21; H04B 1/26; H04B 1/7085; H04B 1/06; H04B 1/7075; H04B 1/1027; H04B 1/709; H04B 1/713; H04L 27/2273; H04L 27/0014; H04L 27/2647;
(Continued)

(56) References Cited

U.S. PATENT DOCUMENTS 3,863,156 A 1/1975 Bogert
6,970,048 B1 11/2005 Devnath et al.
10,972,108 B1 4/2021 Li et al.

FOREIGN PATENT DOCUMENTS

GB 1284876 A 8/1972

OTHER PUBLICATIONS

Rofougaran, A., et al., "A 900MHz CMOS LC-Oscillator with Quadrature Outputs," IEEE International Solid-State Circuits Conference, Session 24, Analog Techniques, Paper SP 24.6, Feb. 10, 1996, 2 pages.

*Primary Examiner* — Lincoln D Donovan
*Assistant Examiner* — James G Yeaman
(74) *Attorney, Agent, or Firm* — Slater Matsil, LLP

(57) ABSTRACT

Embodiments provide a device that includes a first circuit having a first input to receive a first sine wave signal and a second input to receive a second sine wave signal in quadrature with respect to each other and a current mode logic gate having a first input coupled to a first output of the first circuit and a second input coupled to a second output of the first circuit. The first circuit configured to deliver a first square wave signal and a second square wave signal. The current mode logic gate is configured to deliver a third square wave signal at a first level and a fourth square wave signal at a second level when the first and second square wave signals are simultaneously at their first levels and the first square wave signal is ahead of the second square wave signal.

26 Claims, 4 Drawing Sheets

(58) Field of Classification Search
CPC ............. H04L 27/3863; H04L 25/4902; H04L 27/364; H04L 2027/0016; H04L 27/0004; H04L 27/22; H04L 2027/003; H04L 27/2332; H04L 5/0048; H04L 27/0008; H04L 27/18; H04L 27/38; H04L 27/2657; H03B 5/1228; H03B 2200/0078; Y02D 30/70; G01S 13/0209; G01S 5/14; G01S 13/931; G01S 13/765; H03D 7/165; H03D 3/007; H03D 3/009; H04W 64/00; H03F 3/24; H03F 2200/451
See application file for complete search history.

ELECTRONIC CIRCUIT FOR DELIVERING SIGNALS IN QUADRATURE

CROSS-REFERENCE TO RELATED APPLICATIONS

This application claims the benefit of French Application No. 2211018, filed on Oct. 24, 2022, which application is hereby incorporated herein by reference.

TECHNICAL FIELD

The present disclosure generally concerns electronic circuits and, in particular embodiments, to electronic circuits comprising circuits for delivering two signals in quadrature.

BACKGROUND

Electronic circuits for ultra wide band (UWB) technologies or applications, which allow accurate measurements of the distance between a transmitter and a wireless receiver, are known. Such circuits are called Ultra Wide Band circuits.

In particular, a UWB receiver circuit comprises a mixer configured to shift the frequency of a received signal having a frequency in the range from, for example, 6 to 10 GHz, into two baseband signals. A first one of the two baseband signals is ahead of the second one, the second baseband signal then being phase-lagged with respect to the first one. The obtaining of the two baseband signals requires two signals, currently called local oscillator signals, respectively in phase and in phase quadrature. To allow a digital processing of the baseband signals, for example, to accurately determine a distance measurement between the UWB receiver and a UWB transmitter, there is a need to know which of the two local oscillator signals is the I signal in phase and which is the Q signal in phase quadrature, and to know which of the two baseband signals is the signal which is ahead, and which is the signal which is phase-lagged.

SUMMARY

There exists a need to overcome all or part of the disadvantages of known Ultra Wide Band circuits.

For example, there is a need for an Ultra Wide Band circuit enabling to identify among two local oscillator signals in quadrature which one is the I signal in phase and which one is the Q signal in quadrature.

An embodiment overcomes all or part of the disadvantages of known Ultra Wide Band circuits.

For example, an embodiment provides an Ultra Wide Band circuit capable of identifying among two local oscillator signals in quadrature which one is the signal I in phase and which one is the signal Q in quadrature.

More generally, an embodiment overcomes all or part of the disadvantages of known circuits where two signals in quadrature are generated.

For example, an embodiment provides a circuit capable of identifying which is the signal I in phase and which is the signal Q in quadrature between two signals in quadrature generated in the circuit.

An embodiment provides a device comprising a first circuit intended to receive a first sine wave signal and a second sine wave signal in quadrature with respect to each other. The first circuit is configured to deliver a first square wave signal having a first level if the first sine wave signal is positive with respect to its DC component and a second level otherwise, and a second square wave signal having a first level if the second sine wave signal is positive with respect to its DC component and a second level otherwise. A current mode logic gate is configured to receive the first and second square wave signals and to deliver a third square wave signal at a first level and a fourth square wave signal at a second level when the first and second square wave signals are simultaneously at their first levels and the first square wave signal is ahead of the second square wave signal. The third square wave signal at a second level and the fourth square wave signal at a first level when the first and second square wave signals are simultaneously at their first levels and the second square wave signal is ahead of the first square wave signal.

According to an embodiment, the logic gate is configured so that the third square wave signal switches from its first level to its second level only when the second square wave signal switches from its second level to its first level during the first level of the first square wave signal, the third square wave signal then remaining at its second level only as long as the first and second square wave signals remain at their first levels. The fourth square wave signal switches from its first level to its second level only when the first square wave signal switches from its second level to its first level during the first level of the second square wave signal, the fourth square wave signal then remaining at its second level only as long as the first and second square wave signals remain at their first levels.

According to an embodiment, the first circuit comprises two identical conversion circuits. Each conversion circuit comprises an input node and an output node, an inverter having an output coupled to the output node, a resistor coupling an input of the inverter to the output of the inverter, and a capacitive element coupling the input node to the input of the inverter. The input node and the output node of one of the two conversion circuits are configured to respectively receive the first sine wave signal and deliver the first square wave signal and the input node and the output node of the other one of the two conversion circuits are configured to respectively receive the second sine wave signal and deliver the second square wave signal.

According to an embodiment, each conversion circuit further comprises a first switch in series with the resistor, between the input and the output of the inverter and a second switch coupling the input of the inverter to a voltage capable of forcing a given state of the output of the inverter when the second switch is on.

According to an embodiment, the logic gate comprises a reference node, a power supply node, and first, second, third, fourth, fifth, and sixth nodes, a first transistor connected between the reference node and the first node and having a gate configured to receive a first control signal determined by the first square wave signal, a second transistor connected between the first and second nodes and having a gate connected to the third node, a first resistor coupling the second node to the power supply node, a third transistor connected between the first and third nodes and having a gate connected to the fourth node, second resistor coupling the third node to the power supply node, a fourth transistor connected between the reference node and the fifth node and having a gate configured to receive a second control signal determined by the same square wave signal, a fifth transistor connected between the fifth and fourth nodes and having a gate connected to the sixth node, a third resistor coupling the sixth node to the power supply node, a sixth transistor connected between the fifth and sixth nodes and having a gate connected to the second node, and a fourth resistor coupling the fourth node to the power supply node, said second and fourth nodes being configured to respectively deliver the third and fourth square wave signals.

According to an embodiment, the logic gate further comprises two identical control circuits, each comprising an input and an output, each control circuit being configured to deliver, on its output, a square wave signal having an AC component determined by the AC component of a square wave signal received on its input and to set a DC component of the signal delivered on its output, a first one of the two control circuits being configured to receive the first square wave signal on its input and to deliver the first control signal on its output and a second one of the two control circuits being configured to receive the second square wave signal on its input and to deliver the second control signal on its output.

According to an embodiment, the first circuit is further intended to receive a third sine wave signal in phase opposition with the first sine wave signal and a fourth sine wave signal in phase opposition with the second sine wave signal. The first circuit is further configured to deliver a fifth square wave signal having a first level is the third sine wave signal is positive with respect to its DC component and a second level otherwise, and a sixth square wave signal having a first level if the fourth sine wave signal is positive with respect to its DC voltage and a second level otherwise.

According to an embodiment, each of the two control circuits comprises an additional input, a first node, a second node, and a third node. The third node is coupled to the output of the control circuit. A first transistor is connected between the reference node and the first node of the control circuit and having a gate configured to receive a first bias voltage. A second transistor is connected between the first and second nodes of the control circuit and having a gate coupled to the input of the control circuit. A first resistor couples the second node of the control circuit to the power supply node. A third transistor connected between the first and third nodes of the control circuit and having a gate coupled to the additional input of the control circuit. A second resistor coupling the third node of the control circuit to the power supply node. The additional input of the first control circuit is configured to receive the fifth square wave signal and the additional input of the second control circuit is configured to receive the sixth square wave signal.

According to an embodiment, each control circuit further comprises a first capacitive element coupling the input of the control circuit to the gate of the second transistor of the control circuit, a third resistor coupling the gate of the second transistor of the control circuit to a fourth node of the control circuit, the fourth node being configured to receive a first DC voltage, a second capacitive element coupling the additional input of the control circuit to the gate of the third transistor of the control circuit, a fourth resistor coupling the gate of the third transistor of the control circuit to the fourth node, a third capacitive element coupling the third node of the control circuit to the output of the control circuit, and a fifth resistor coupling the output of the control circuit to a fifth node of the control circuit, the fifth node being configured to receive a second DC voltage.

According to an embodiment, the device further comprises a current mode logic writing and storage circuit comprising a first input configured to receive the third square wave signal, a second input configured to receive the fourth square wave signal, a first output configured to deliver a first output signal, and a second output configured to deliver a second output signal. The writing and storage circuit is configured so that a level of the first and second output signals is determined by the level, respectively, of the third and fourth square wave signals when the first and second square wave signals are simultaneously at their first levels. The writing and storage circuit is also configured to store the level of the first and second output signals otherwise.

According to an embodiment, the writing and storage circuit comprises a first current mode logic flip-flop and a second current mode logic flip-flop, the first flip-flop is configured to receive the third square wave signal and to deliver the first output signal, and the second flip-flop is configured to receive the fourth square wave signal and to deliver the second output signal.

According to an embodiment, each of the first and second flip-flops comprises a reference node, a power supply node, and first, second, third, and fourth nodes. A current mode logic circuit is configured to receive a signal and to deliver a signal in phase with the received signal and a signal in phase opposition with the received signal. A first transistor is connected between the reference node and the first node. A gate of the first transistor is configured to receive a signal indicating when the first and second square wave signals are simultaneously at their first levels. A second transistor is connected between the first and second nodes and having a gate configured to receive the signal in phase. A first resistor couples the second node to the power supply node. A third transistor is connected between the first and second nodes and having a gate configured to receive the signal in phase opposition. A second resistor couples the third node to the power supply node. Fourth, fifth, and sixth transistors are each connected between the reference node and the fourth node. A gate of the fourth transistor is configured to receive a signal indicating when the first and second square wave signals are simultaneously at their second levels. A gate of the fifth transistor is configured to receive a signal indicating when the first and second square wave signals are simultaneously and respectively at their first level and at their second level. A gate of the sixth transistor is configured to receive a signal indicating when the first and second square wave signals are simultaneously and respectively at their second level and their first level. A seventh transistor is connected between the fourth and second nodes and having a gate connected to the third node. An eighth transistor is connected between the fourth and third nodes and having a gate connected to the second node. The current mode logic circuit of the first flip-flop is configured to receive the third square wave signal. The current mode logic circuit of the second flip-flop is configured to receive the fourth square wave signal. One of the first and second nodes of the first flip-flop is configured to deliver the first output signal. One of the first and second nodes of the second flip-flop is configured to deliver the second output signal.

According to an embodiment, each current mode logic circuit comprises a reference node, a power supply node, and first, second, and third nodes. A first MOS transistor is connected between the reference node at the first node and having a gate configured to receive a bias voltage. A second MOS transistor is connected between the first and second nodes and having a gate configured to receive the signal received by the current mode logic circuit. A third MOS transistor is connected between the first and third nodes and having a gate connected to the second node. A resistor couples the second node to the power supply node and another resistor couples the third node to the power supply node. T second and third nodes are configured to respectively deliver the signals in phase opposition and in phase delivered by the current mode logic circuit.

According to an embodiment, the writing and storage circuit further comprises a current mode logic gate configured to deliver the signal indicating when the first and second square wave signals are at their first levels, the signal indicating when the first and second square wave signals are at their second levels, the signal indicating when the first and second square wave signals respectively are at their first and second levels, and the signal indicating when the first and second square wave signals are respectively at their second and first levels.

According to an embodiment, the writing and storage circuit further comprises a current mode logic gate configured to receive the first, second, fifth, and sixth signals and to deliver, based on the received signals, the signal indicating when the first and second square wave signals are at their first levels, the signal indicating when the first and second square wave signals are at their second levels, the signal indicating when the first and second square wave signals are respectively at their first and second levels, and the signal indicating when the first and second square wave signals respectively are at their second and first levels.

According to an embodiment, the logic gate of the writing and storage circuit comprises a current mode logic NAND gate configured to receive four signals determined by respectively the first, second, fourth, and fifth square wave signals and to deliver first, second, third, and fourth output signals. Four inverters are configured to respectively receive the four output signals of the logic NAND gate and to respectively deliver the signal indicating when the first and second square wave signals are at their first levels, the signal indicating when the first and second square wave signals are at their second levels, the signal indicating when the first and second square wave signals are respectively at their first and second levels, and the signal indicating when the first and second square wave signals are respectively at their second and first levels.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional, and material properties.

For the sake of clarity, only the steps and elements that are useful for an understanding of the embodiments described herein have been illustrated and described in detail. In particular, the usual functionalities implemented with I and Q signals have not been detailed, the described embodiments being compatible with these usual functionalities.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, when reference is made to absolute positional qualifiers, such as the terms "front," "back," "top," "bottom," "left," "right," etc., or to relative positional qualifiers, such as the terms "above," "below," "upper," "lower," etc., or to qualifiers of orientation, such as "horizontal," "vertical," etc., reference is made, unless specified otherwise, to the orientation of the figures.

Unless specified otherwise, the expressions "around," "approximately," "substantially" and "in the order of" signify within 10%, and preferably within 5%.

In the following description, when it is indicated that a signal has a first level and a second level, for example, a high level and a low level, this means that the signal alternates between the first level and the second level, it being understood that, in practice, each level may correspond to a voltage or to a current which may not be perfectly constant. Such a signal is, for example, called square wave signal.

In an Ultra Wide Band receiver circuit, due to the frequency of the received signal, it is complex, or even impossible, to generate with a same oscillator, for example, with a single voltage-controlled oscillator (VCO), the two I and Q local oscillator signals used to generate the two baseband signals. This is all the truer when it is desired for the receiver circuit to operate over a plurality, or even all, of the channels of the UWB standard.

A solution to generate the I and Q local oscillator signals then is to use two interconnected oscillators, that is, coupled to each other, configured so that one of the two oscillators delivers the I signal and the other delivers the Q signal. An example of two voltage-controlled oscillators enabling to generate two sine wave signals in quadrature with respect to each other is described in the article "900 MHz CMOS LC-Oscillator with Quadrature Outputs" by Rofougaran et al published in 1996, in IEEE International Solid-State Circuits Conference (ISSCC).

Figure 1:
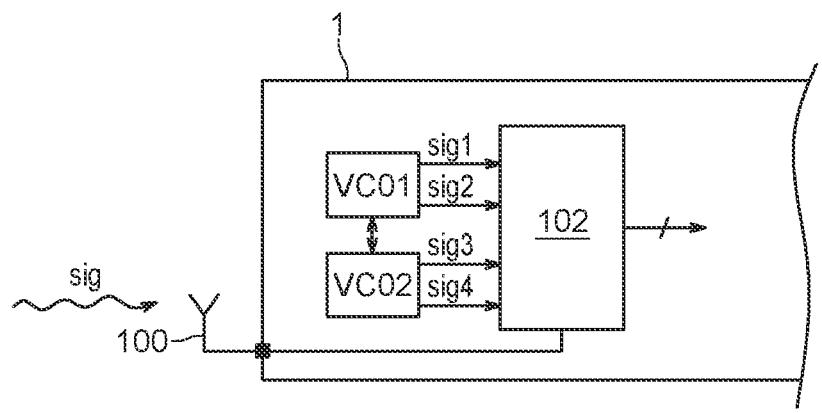
FIG. 1 shows, in the form of blocks, an example of a circuit using I and Q signals.

FIG. 1 shows, in the form of blocks, an example of a circuit or device 1 delivering and using I and Q signals, where the I and Q signals are two local oscillator signals generated by two oscillators in quadrature.

In this example, device 1 is a wireless device for receiving an Ultra Wide Band signal sig. Signal sig is received by an antenna 100, which transmits it to a processing circuit 102. As an example, circuit 102 comprises a frequency shifting circuit (not shown) configured to generate two baseband signals by mixing the signal sig received with the two I and Q local oscillator signals.

To generate the two I and Q signals, device 1 comprises two voltage-controlled oscillators VCO1 and VCO2. Oscillators VCO1 and VCO2 are coupled to each other and are controlled to deliver sine wave signals at a frequency determined by the frequency of the carrier of signal sig, the frequency of the local oscillator signals is, for example, close to the carrier frequency of signal sig, or even equal thereto. For example, oscillators VCO1 and VCO2 form part of a phase-locked loop (not shown) configured so that the frequency of the signals generated by oscillators VCO1 and VCO2 is determined by the frequency of the carrier of signal sig.

Oscillator VCO1, respectively VCO2, is configured to deliver a sine wave signal sig1, respectively sig3, local oscillator signals sig1 and sig3 being in quadrature with each other. In practice, oscillator VCO1, respectively VCO2, also delivers a sine wave signal sig2, respectively sig4, in phase opposition with signal sig1, respectively sig3.

Signals sig1 and sig3 are supplied to circuit 102, and signals sig2 and sig3 can be supplied to circuit 102.

A problem posed in device 1 is that the signal sig1 and sig3, which is the I signal, is not determined and depends on the starting of oscillators VCO1 and VCO2.

It is known to have different starting sequences between oscillators VCO1 and VCO2, to force one of the two signals sig1 and sig3 to be the I signal. However, this increases the time necessary for the stabilization of the two oscillators VCO1 and VCO2 at each start or carrier frequency change.

It is also known to add a phase error in one of the two oscillators VCO1 and VCO2 to force one of the two signals sig1 and sig3 to be the I signal. However, the introduction of a phase error is not desirable, for example, since this results in an error on the distance determined by device 1 based on signal sig and on the I and Q signals.

It is also known to introduce a difference between bias currents of the two oscillators VCO1 and VCO2 to force one of the two signals sig1 and sig3 to be the I signal. However, this results in an amplitude difference between signals sig1 and sig3, which is not desirable.

An I and Q signals detection circuit enabling to determine, from among signals sig1 and sig3, that which is the I signal and that which is the Q signal, without introducing an imbalance between the two oscillators VCO1 and VCO2 conversely to what is done in the known solutions described hereinabove, is here provided.

The provided circuit is intended to receive signals sig1 and sig3, may be intended to also receive signals sig2 and sig4, and is configured to deliver two signals O1 and O2 based on which it is possible to identify, after the starting of oscillators VCO1 and VCO2, whether signals sig1 and sig3 respectively correspond to the I and Q signals or respectively to the Q and I signals. Thus, based on the two signals O1 and O2, processing circuit 102 may switch between a configuration where it uses signals sig1 and sig3 as I and Q signals, respectively, and a configuration where it uses signals sig1 and sig3 as Q and I signals, respectively.

Figure 2:
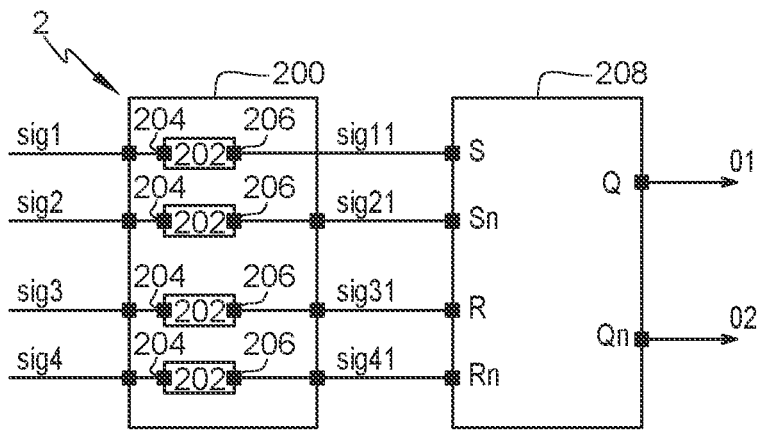
FIG. 2 shows, in the form of blocks, an embodiment of an I and Q signals detection circuit.

FIG. 2 shows, in the form of blocks, an embodiment of an I and Q signals detection circuit or device 2.

Device 2 comprises a circuit 200 configured to convert sine wave signals sig1 and sig3 into two corresponding square wave signals sig11 and sig31.

Circuit 200 is configured to receive signals sig1 and sig3 in quadrature with each other. Circuit 200 is configured to deliver signal sig11 at a first level, for example, high, when signal sig1 is positive with respect to its DC component, that is, when the value of signal sig1 is higher than the value of its DC component, and at a second level, for example, low, when signal sig1 is negative with respect to its DC component, that is, when the value of signal sig1 is lower than the value of its DC component. Circuit 200 is further configured to deliver signal sig31 at a first level, for example, high, when signal sig3 is positive with respect to its DC component and at a second level, for example, low, when signal sig3 is negative with respect to its DC component. Preferably, the first levels of square wave signals sig11 and sig31 correspond to a same first value, and the second levels of square wave signals sig11 and sig31 correspond to a same second voltage value.

According to an embodiment, circuit 200 comprises two identical circuits 202, each configured to convert a sine wave signal into a corresponding square wave signal. Thus, each circuit 202 comprises an input 204 configured to receive a sine wave signal and an output 206 configured to deliver the corresponding square wave signal.

More particularly, one of the two circuits 202 is configured to receive signal sig1 on its input 204 and to deliver signal sig11 on its output 206, the other one of the two circuits 202 being configured to receive signal sig3 on its input 204 and to deliver signal sig31 on its output 206.

Device 2 further comprises a logic gate 208. Logic gate 208 is implemented in CML (Current Mode Logic) technology. In other words, gate 208 is a current mode logic gate. Gate 208 is configured to receive signals sig11 and sig31, for example, on respective inputs S and R. Gate 208 is further configured to deliver the two signals O1 and O2, for example, on respective outputs A and Qn. Signals O1 and O2 are square wave signals. The switching of signals O1 and O2 between their levels are determined by the order of arrival, that is, the sequence, and the switching direction of signals sig11 and sig31 on logic gate 208. The two signals O1 and O2 are two signals enabling to determine which one of signals sig1 and sig3 is the I signal.

According to an embodiment, gate 208 is configured so that signals O1 and O2 are respectively at a first level, for example, high, and at a second level, for example, low, when the two signals sig11 and sig31 are at their first levels, for example, high, and signals sig11 and sig3i (and thus signals sig1 and sig3) respectively are the I and Q signals. Complementarily, gate 208 is further configured so that signals O1 and O2 are respectively at a second level, for example, low, and at a first level, for example, high, when the two signals sig11 and sig31 are at their first levels (for example, high) and signals sig11 and sig31 (and thus signals sig1 and sig3) respectively are the Q and I signals. Preferably, gate 208 is further configured so that signals O1 and O2 are at their first levels (for example, high) when signals sig11 and sig31 are simultaneously at their second levels (for example, low).

According to an embodiment, gate 208 is more particularly configured so that signal O1 (Q output) switches from a first level, for example, high, to a second level, for example, low, only when signal sig11 (S input) switches from its second level to its first level while signal sig31 (R input) is at its first level. Further, after such a switching of signal O1, gate 208 is configured to hold signal O1 at its second level only as long as the two signals sig11 and sig31 remain at their first levels. Gate 208 is for example configured so that signal O1 is at its first level in all the other cases. Symmetrically or complementarily, gate 208 is further configured so that signal O2 (Qn output) switches from a first level, for example, high, to a second level, for example, low, only when signal sig31 (R input) switches from its second level to its first level while signal sig11 (S input) is at its first level. Further, after such a switching of signal O2, gate 208 is configured to hold signal O2 at its second level only as long as signals sig11 and sig31 remain at their first levels. Gate 208 is, for example, configured so that signal O2 is at its first level in all the other cases.

Preferably, the first levels of square wave signals O1 and O2 correspond to a same first voltage value, and the second levels of square wave signals O1 and O2 correspond to a same second voltage value.

Figure 3:
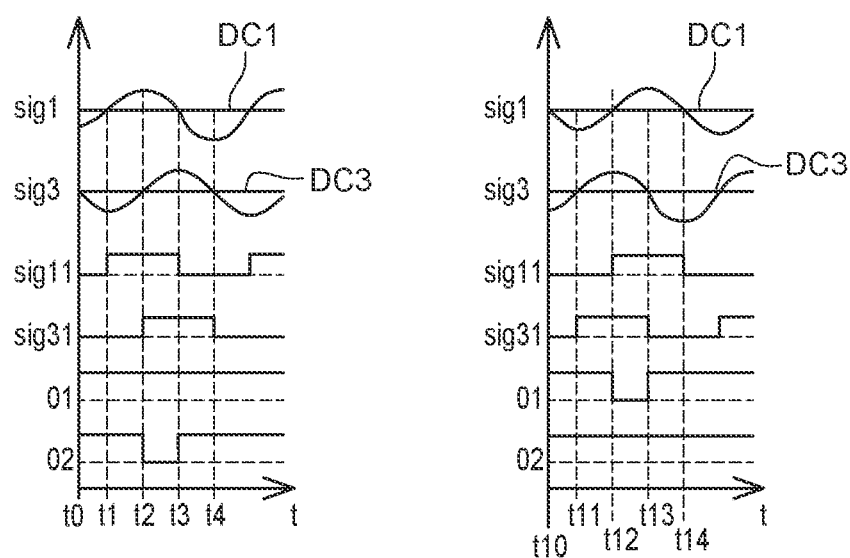
FIG. 3 illustrates in timing diagrams an example of a operating mode of the circuit of FIG. 2.

FIG. 3 illustrates in timing diagrams an example of an operating mode of the circuit of FIG. 2. In the example of FIG. 3, the first levels of signals sig11, sig31, O1, and O2 are high levels, the second levels of signals sig11, sig31, O1, and O2 being low levels. More particularly, this FIG. 3 illustrates the operation of the circuit of FIG. 2 in the case where circuit 208 is configured so that signal O1 switches to its second level only when signal sig11 switches to its first level while signal sig31 is at its first level, signal O2 switches to its second level only when signal sig31 switches to its first level while signal sig11 is at its first level, the levels of signals O1 and O2 are kept when signals sig11 and sig13 are both at their first level, signals O1 and O2 are at their first levels when signals sig11 and sig31 are simultaneously at their second levels.

FIG. 3 illustrates for two cases, respectively on the left-hand side and on the right-hand side in FIG. 3, the shape of signals sig1, sig3, sig11, sig31, O1, and O2. The case on the left-hand side in FIG. 3 corresponds to the case where signals sig1 and sig3 are the respective I and Q signals and the case on the right-hand side in FIG. 3 corresponds to the case where signals sig1 and sig3 are the respective Q and I signals. In FIG. 3, the DC component of signals sigh and sig3 is respectively referred to as DC1 and DC3.

On the left-hand side in FIG. 3, at a time t0, signal sig1, respectively sig3, has a value lower than its DC component DC1, respectively DC3. Signals sig11 and sig31 then are at their second levels. Further, signals O1 and O2 then are at their first levels.

At a time t1 subsequent to time t0, signal sigh becomes higher than its DC component DC1 while signal sig3 is still lower than its DC component DC3. As a result, signal sig11 switches to its first level while signal sig31 remains at its second level. Signals O1 and O2 then remain at their first levels.

At a time t2 subsequent to time t1, signal sig3 becomes higher than its DC component DC3 while signal sigh is still higher than its DC component DC1. As a result, signal sig31 switches to its first level while signal sig11 is at its first level. As a result, signal O2 switches from its first level to its second level while signal O1 remains at its first level.

At a time t3 subsequent to time t2, signal sigh becomes lower than its DC component DC1 while signal sig3 is still higher than its DC component DC3. As a result, signal sig11 switches to its second level while signal sig31 remains at its first level. Thus, between times t2 and t3, signal O2 is held at its second level and signal O1 remains at its first level and, further, at time t3, signal O2 switches to its first level.

At a time t4 subsequent to time t3, signal sig3 becomes lower than its DC component DC3 while signal sig1 is still lower than its DC component DC1. As a result, signal sig31 switches to its second level while signal sig11 remains at its second level.

After time t4, signals sig1, sig3, sig11, sig31, O1, and O2 are in the same configuration as at time t0, and the switching operations described in relation with successive times t1, t2, t3, and t4 are repeated for the next periods of signals sig1 and sig2.

On the right-hand side in FIG. 3, at a time t10, signals sig1, sig3, sig11, sig31, O1, and O2 are in the same configuration as that described in relation with time t0.

At a time t11 subsequent to time t10, signal sig3 becomes higher than its DC component DC3 while signal sigh is still lower than its DC component DC1. As a result, signal sig31 switches to its first level while signal sig11 remains at its second level. Signals O1 and O2 then remain at their first levels.

At a time t12 subsequent to time t11, signal sigh becomes higher than its DC component DC1 while signal sig3 is still higher than its DC component DC3. As a result, signal sig11 switches to its first level while signal sig31 is at its first level. As a result, signal O1 switches from its first level to its second level while signal O2 remains at its first level.

At a time t13 subsequent to time t12, signal sig3 becomes lower than its DC component DC3 while signal sigh is still higher than its DC component DC1. As a result, signal sig31 switches to its second level while signal sig11 remains at its first level. Thus, between times t12 and t13, signal O1 is held at its second level, signal O2 remains at its first level and, further, at time t13, signal O1 switches to its first level.

At a time t14 subsequent to time t13, signal sig1 becomes lower than its DC component DC1 while signal sig3 is still lower than its DC component DC3. As a result, signal sig11 switches to its second level while signal sig31 remains at its second level.

After time t14, signals sig1, sig3, sig11, sig31, O1, and O2 are in the same configuration as at time t10, and the switching operations described in relation with successive times t11, t12, t13, and t14 are repeated for the next periods of signals sig1 and sig3.

As shown in FIG. 3, when signals sig11 and sig31 are both at their first levels:

signals O1 and O2 are respectively at their first and second levels if signals sig1 and sig3 respectively are the I and Q signals, and, conversely, signals O1 and O2 respectively are at their second and first levels if signals sig1 and sig3 respectively are the Q and I signals.

The levels of signals O1 and O2 when signals sig11 and sig31 are at their first levels thus enable to determine which one of signals sigh and sig3 is the I signal and the Q signal.

Referring again to FIG. 2, optionally, circuit 200 is further configured to convert signals sig2 and sig4 into two corresponding square wave signals sig21 and sig41. Circuit 200 is then configured to receive signal sig2 in phase opposition with signal sigh and signal sig4 in phase opposition with signal sig3. Circuit 200 is then configured to deliver signal sig21 at a first level, for example, high, when signal sig2 is positive with respect to its DC component and at a second level, for example, low, when signal sig2 is negative with respect to its DC component, and to deliver signal sig41 at a first level, for example, high, when signal sig4 is positive with respect to its DC component and at a second level, for example, low, when signal sig4 is negative with respect to its DC component. Preferably, the first levels of square wave signals sig11, sig21, sig31, and sig41 correspond to a same first voltage value, and the second levels of square wave signals sig11, sig21, sig31, and sig41 correspond to a same second voltage value.

According to an embodiment, circuit 200 comprises two additional circuits 202 for delivering signals sig21 and sig41 based on the respective signals sig2 and sig4.

More particularly, one of the two additional circuits 202 is configured to receive signal sig2 on its input 204 and to deliver signal sig21 on its output 206, the other one of the two additional circuits 202 being configured to receive signal sig4 on its input 204 and to deliver signal sig41 on its output 206.

According to an embodiment, signals sig21 and sig41 are delivered to gate 208, for example, to two respective inputs Sn and Rn of gate 208. Indeed, in embodiments, gate 208 uses, in addition to signals sig11 and sig31, signals sig21 and sig41 to generate signals O1 and O2.

Figure 4:
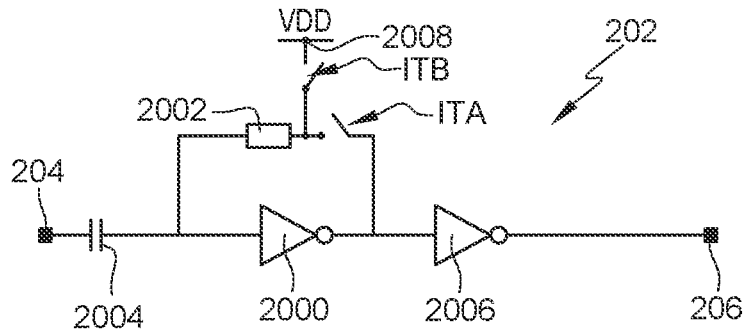
FIG. 4 shows an example of an embodiment of a circuit of the detector of FIG. 2.

FIG. 4 shows an example of an embodiment of a circuit 202 of FIG. 2.

Circuit 202 comprises input, or input node, 204 and output, or output node, 206.

Circuit 202 comprises an inverter 2000. Inverter 2000 couples node 204 to node 206. Inverter 2000 has, for example, an input coupled to node 204 and an output coupled to node 206.

Circuit 202 further comprises a resistive feedback loop coupling the output of inverter 2000 to the input of inverter 2000. The feedback loop is configured so that the inverter operates at its midpoint.

More particularly, in this example, the feedback loop comprises a resistor 2002 coupling the input and the output of inverter 2000 to each other. For example, a terminal of resistor 2002 is coupled, preferably connected, to the input of inverter 2000, and another terminal of resistor 2002 is coupled to the output of inverter 2000.

The input of inverter 2000 is coupled to the input node 204 of circuit 202 by a capacitive element 2004. Capacitive element 2004 has, for example, a terminal coupled, preferably connected, to the input of inverter 2000, and another terminal coupled, preferably connected, to node 204.

In other examples, not illustrated, resistor 2002 is in series with other resistors between the input and the output of inverter 2000. For example, an additional resistor may be provided between switch ITA and the output of inverter 2000.

According to an embodiment, the output of inverter 2000 is coupled to node 206 by one or a plurality of inverters 2006 in series between the output of inverter 2000 and node 206. Inverter(s) 2006 are sized to adapt a value of the current that circuit 202 is capable of delivering on, or of drawing from, its output node 206. In the example of FIG. 4, circuit 202 has an even number of inverters in series between its nods 204 and 206, that is, inverter 2000 and an inverter 2006, whereby the signal on node 206 is at a high state when the signal one node 204 is positive with respect to its DC component, and at a low level otherwise. In other examples, not illustrated, this number of inverters may be uneven, whereby the signal on node 206 is at a low, respectively high, level when the signal on node 204 is positive, respectively negative, with respect to its DC component.

In an alternative embodiment, the output of inverter 2000 is directly connected to node 206, inverters 2006 being omitted.

According to an embodiment, circuit 202 further comprises a switch ITA connected in series with resistor 2002, between the input and the output of inverter 2000. Switch 2002 is configured to selectively open or close the feedback loop. For example, switch ITA couples resistor 2002 to the output of inverter 2000. For example, switch ITA has a conduction terminal coupled, for example, connected, to the output of inverter 2000, and another conduction terminal coupled, for example connected, to resistor 2002. In another example, not illustrated, switch ITA is connected between resistor 2002 and the input of inverter 2000. In still another example, not illustrated, in addition to resistor 2002 between the input of inverter 2000 and switch ITA, the feedback loop comprises another resistor 2002 between switch ITA and the output of inverter 2000.

In an embodiment comprising switch ITA, circuit 202 further comprises, preferably, a switch ITB coupling the input of inverter 2000 to a node 2008. Node 2008 is configured to receive a voltage capable of forcing the output of inverter 2000 to a given state when switch ITB is on and, preferably, switch ITA is off. For example, inverter ITB has a first conduction terminal coupled, preferably connected, to node 2008, and a second conduction terminal coupled to the input of inverter 2000. In this example, the second conduction terminal of inverter 2000 is coupled to the input of inverter 2000 by resistor 2002. In another example, not illustrated, switch ITB has a terminal connected to the input of inverter 2000. As an example, the voltage on node 2008 is a first power supply voltage VDD of circuit 202, and, more generally, of device 2 (FIG. 2). Voltage VDD is, for example, referenced to a second power supply voltage (or reference voltage), for example, ground GND, and is positive with respect thereto. According to another example, the voltage on node 2008 is ground GND.

Switches ITA and ITB enable, once the signals O1 and O2 of device 2 (FIG. 2) have enabled to identify which one of signals sig1 and sig3 is signal I, to implement device 2 in a constant (or stationary) state, for example a state where signals sig11 and sig31 no longer switch. Switch ITA, respectively ITB, is then off (open), respectively on (closed). This steady state of device 2 enables to decrease the power consumption, due to the fact that there is no further dynamic power consumption resulting from switching operations in device 2. The selection of voltage VDD or GND on node 2008 depends on the number of inverters 2006 and on the high or low level that is desired to be present on node 206 when switches ITA and ITB are respectively off and on.

In an alternative embodiment, one and/or the other of switches ITA and ITB may be omitted.

As an example, each inverter 2000, 2006 of circuit 202 is implemented in CMOS (Complementary MOS) technology. As an example, each inverter is powered with voltages VDD and GND.

The circuits 202 of circuit 200 (FIG. 2) are preferably identical to one another.

Figure 5:
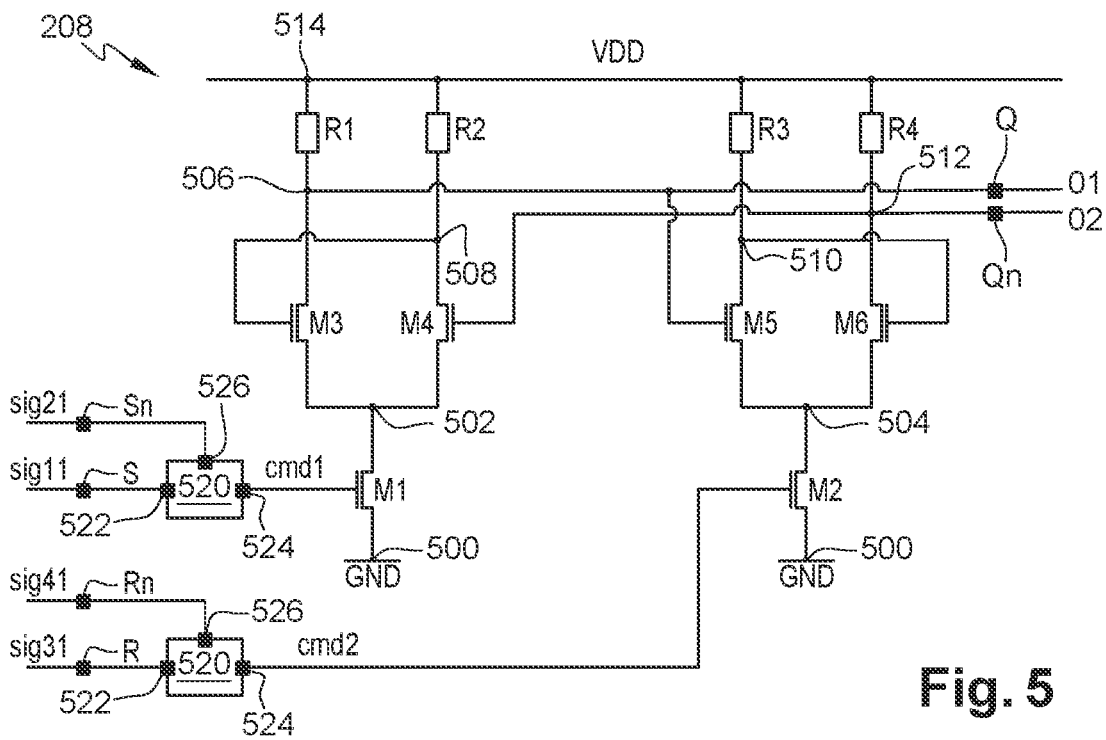
FIG. 5 shows an example of an embodiment of a circuit of the detector of FIG. 2.

FIG. 5 shows an example of an embodiment of the circuit 208 of the device 2 of FIG. 2.

Gate 208 comprises the R and S inputs and the Q and Qn outputs. Input S is configured to receive signal sig11, the R input being configured to receive signal sig31. The Q output is configured to deliver signal O1, the Qn output being configured to deliver signal O2.

Gate 208 comprises a MOS (Metal Oxide Semiconductor) transistor M1. Transistor M1 is connected between nodes 500 and 502 of gate 208. Node 500 is configured to receive a power supply voltage, reference voltage GND in this example, node 500 then being called reference node. For example, the conduction terminals (source and drain) of transistor M1 are coupled, preferably connected, to respective nodes 500 and 502. In this example, transistor M1 has an N channel and has its source connected to node 500, and its drain connected to node 502.

The gate of transistor M1 is configured to receive a control signal cmd1, signal cmd1 being determined by signal sig11. For example, signal cmd1 is a square wave signal having a first level, for example, high, when signal sig11 is at its first level, and a second level, for example, low, when signal sig11 is at its second level.

Symmetrically, gate 208 further comprises a MOS transistor M2. Transistor M2 is connected between node 500 and a node 504 of gate 208. For example, the conduction terminals of transistor M2 are coupled, preferably connected, to respectively nodes 500 and 504. In this example, transistor M2 has an N channel and has its source connected to node 500, and its drain connected to node 504.

The gate of transistor M2 is configured to receive a control signal cmd2, signal cmd2 being determined by signal sig31. For example, signal cmd2 is a square wave signal having a first level, for example, high, when signal sig31 is at its first level, and a second level, for example, low, when signal sig31 is at its second level.

Thus, the AC (Alternative Current) component of each of signals cmd1 and cmd2 is determined by that of respective signals sig11 and sig31. As an example, signal cmd1, respectively cmd2, has a DC component configured so that transistor M1, respectively M2, operates in saturation (conductive transistor) when signal cmd1, respectively cmd2, is at its first level (high in this example) and is non-conductive when signal cmd1, respectively cmd2, is at its second level (low in this example).

Preferably, transistors M1 and M2 have identical dimensions.

Gate 208 further comprises four MOS transistors M3, M4, M5, and M6 respectively connected between node 502 and a node 506 of gate 208, between node 502 and a node 508 of gate 208, between node 504 and a node 510 of gate 208, and between node 504 and a node 512 of gate 208. Further, the gate of transistor M3 is connected to node 508, the gate of transistor M4 is connected to node 512, the gate of transistor M5 is connected to node 506, and the gate of transistor M6 is connected to node 510.

In this example, transistors M3, M4, M5, and M6 have an N channel and have their sources respectively connected to node 502, to node 502, to node 504, and to node 504.

Preferably, transistors M3, M4, M5, and M6 have identical dimensions.

Transistors M3 and M4 form a differential pair biased by transistor M1, transistors M5 and M6 forming another differential pair biased by transistor M2.

Nodes 506, 508, 510, and 512 are each coupled to a node 514 of gate 208, by a resistor, respectively R1, R2, R3, and R4. Preferably, resistors R1, R2, R3, and R4 are identical. Node 514 is configured to receive a power supply voltage different from that received by node 500, node 514 then being called power supply node. In this example, node 514 is configured to receive voltage VDD referenced to ground GND and positive with respect to ground GND.

In this alternative embodiment, which corresponds to the operation described in relation with FIG. 3, node 506 is connected to the Q output, and is configured to deliver signal O1, and node 512 is connected to the Qn output and is configured to deliver signal O2.

Thus, in the circuit 208 of FIG. 5, if signal cmd1, respectively cmd2, is at its second level, for example, low, then signal O1, respectively O2, is at its first level, for example, high. Further, if signal cmd1, respectively cmd2, switches to its first level, for example, high, while signal cmd2, respectively cmd1, is already at its first level, for example, high, signal O1, respectively O2, switches to its second level, for example low, signal O2, respectively O1, remaining at its first level, for example, high.

To deliver signals cmd1 and cmd2 to the respective transistors M1 and M2 based on the respective signals sig11 and sig31, gate 208 comprises two identical circuits 520. Circuits 520 are for example circuits for shaping a received signal into a control signal or, in other words, drivers. In other words, each circuit 520 is configured to adapt the first and second levels of the control signal that it delivers, for example, to control the current flowing through the transistor controlled by this signal. Each circuit 520 comprises an input 522 and an output 524. One of circuits 520 has its input 522 connected to the S input and its output 524 connected to the gate of transistor M1, the other one of circuits 520 has its input 522 connected to the R input and its output 524 connected to the gate of transistor M2. In other words, one of circuits 520 is configured to receive signal sig11 (on its input 522) and to deliver signal cmd1 (on its output 524), the other one of the circuits being configured to receive signal sig3i (on its input 522) and to deliver signal cmd2 (on its output 524). Each circuit 520 is configured so that the square wave signal delivered on its output 524 has an AC component determined by the AC component of the signal that it receives on its input 522 and, further, to set or determine the DC component of the signal that it delivers on its output 524. Preferably, each circuit 520 is configured to deliver a signal on its output 524 at the high level when the signal on its input 522 is at the high level, and a signal on its output 524 at the lower level when the signal on its input 522 is at the low level.

According to an embodiment, for example, an embodiment where circuit 200 (FIG. 2) is configured to also deliver signals sig21 and sig41, each circuit 520 is configured to receive, in addition to the square wave signal on its input 520, a square wave signal on an input 526, the signals on inputs 522 and 526 being in phase opposition with respect to each other. This is for example the case in FIG. 5 where one of circuits 520 receives signals sig11 (input S) and sig21 (input Sn) on its respective inputs 522 and 526, and the other one of circuits 520 receives signals sig31 (input R) and sig41 (input Rn) on its respective inputs 522 and 526.

In an alternative embodiment, each circuit 520 is deprived of input 526.

In an alternative embodiment, node 508 is connected to output Qn and is configured to deliver signal O2, and node 510 is connected to the Q output and is configured to deliver signal O1. In such a variant, gate 208 remains configured so that:

signals O1 and O2 are respectively at a first level, for example high, and at a second level, for example low, when the two signals sig11 and sig31 are at their first levels, for example, high, and signals sig11 and sig31 (and thus signals sig1 and sig3) respectively are the I and Q signals; and signals O1 and O2 are respectively at a second level, for example, low, and at a first level, for example, high, when the two signals sig11 and sig31 are at their first levels (for example high) and signals sig11 and sig31 (and thus signals sig1 and sig3) respectively are the Q and I signals. Preferably, in this variant, gate 208 remains further configured so that signals O1 and O2 are at their first levels, for example, high, when signals sig11 and sig31 are simultaneously at their second levels, for example, low.

More particularly, in this variant, gate 208 is configured so that:

signals O1 and O2 are at their first levels (for example high) when signals sig11 and sig31 are at their second levels (for example, low);

only signal O2 switches from its first level (for example, high) to its second level (for example, low) when signal sig11 (input S) switches from its second level (for example, low) to its first level (for example, high) while signal sig31 (input R) is at its second level (for example, low), signals O2 and O1 then respectively remaining at their second level (for example, low) and at their first level (for example, high) until signal sig11 switches from its first level (for example, high) to its second level (for example low) while signal sig31 is at its first level (for example, high);

signal O2 switches to its first level (for example, high) and, for example, signal O1 switches to its second level (for example, low) when signal sig11 switches from its first level (for example, high) to its second level (for example, low) while signal sig31 is at its first level (for example, high);

only signal O1 switches from its first level (for example high) to its second level (for example, low) when signal sig31 (input R) switches from its second level (for example, low) to its first level (for example high) while signal sig11 (input S) is at its second level (for example, low), signals O2 and O1 then respectively remaining at their first level (for example, high) and at their second level (for example, low) until signal sig31 switches from its first level (for example, high) to its second level (for example, low) while signal sig11 is at its first level (for example, high); and signal O1 switches to its first level (for example, high) and, for example, signal O2 switches to its second level (for example, low) when signal sig31 switches from its first level (for example, high) to its second level (for example, low) while signal sig11 is at its first level (for example high).

Figure 6:
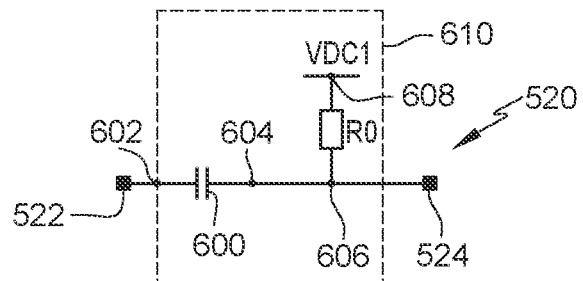
FIG. 6 shows an example of an embodiment of a portion of the circuit of FIG. 5.

FIG. 6 shows an example of an embodiment of a circuit 520 of the gate 208 of FIG. 5. In this example, circuit 520 comprises no input 526.

Circuit 520 comprises a capacitive element 600 coupling the input 522 to the output 524 of circuit 520. For example, a first electrode 602 of capacitive element 600 is connected to input 522, and a second electrode 604 of capacitive element 600 is connected to a node 606, itself connected to output 524 in this example. Further, circuit 520 comprises a resistor R0 coupling output 524 to a node 608 configured to receive a DC voltage, that is, a voltage VDC1 in this example. The DC voltage of node 608 sets, or determines, the DC component of the signal available on the output 524 of circuit 520. For example, resistor R0 has a terminal connected to node 606 and a terminal connected to node 608.

As an example, capacitive element 600 and resistor R0 form a circuit 610 (delimited in dotted lines in FIG. 6) having electrode (or node) 602 as an input, node 606 as an output, and node 608 configured to receive a DC voltage determining the DC component of the signal on the output 606 of circuit 610. Circuit 610 is for example configured to transmit a signal from its input 602 to its output 606 by adapting the DC component of the transmitted signal, that is, by setting the DC component of its output 606.

Figure 7:
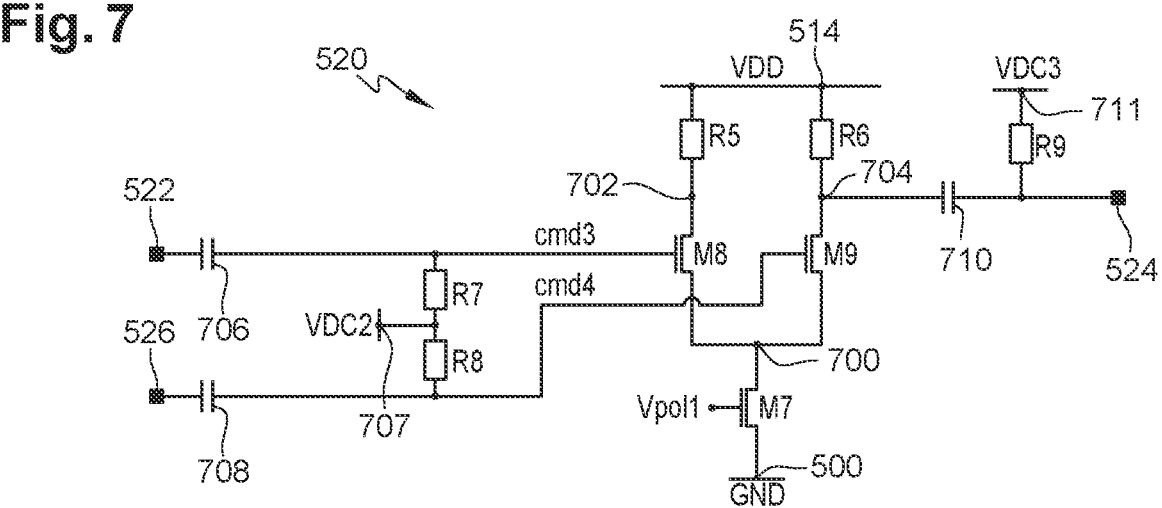
FIG. 7 shows another example of an embodiment of a portion of the circuit of FIG. 5.

FIG. 7 shows another example of an embodiment of a circuit 520 of the gate 208 of FIG. 5. In this example, circuit 520 comprises input 526.

Circuit 520 comprises a MOS transistor M7 connected between reference node 500 and a first node 700 of circuit 520. Transistor M7 has its conduction terminals coupled, preferably connected, to respective nodes 500 and 700. In this example, transistor M7 has an N channel and has its source connected to node 500 and its drain connected to node 700. Transistor M7 has its gate configured to receive a first bias voltage Vpol1. Voltage Vpol1 is configured so that transistor M7 is saturated (conductive).

Circuit 520 further comprises a MOS transistor M8 connected between node 700 and a node 702 of circuit 520. Transistor M8 has its conduction terminals coupled, preferably connected, to respective nodes 700 and 702. In this example, transistor M8 has an N channel and has its source connected to node 700 and its drain connected to node 702. The gate of transistor M8 is coupled to the input 522 of circuit 520. In other words, the gate of transistor M8 is configured to receive a control signal cmd3 determined by the signal received on the input 522 of circuit 520. A resistor R5 of circuit 520 couples node 702 to power supply node 514. For example, resistor R5 has a terminal coupled, preferably connected, to node 700 and has another terminal coupled, preferably connected, to node 702. Signal cmd3 is configured so that a first level of signal cmd3, for example high, keeps transistor M8 saturated (conductive), and so that a second level of signal cmd3, for example, low, keeps transistor M8 non-conductive.

Symmetrically, circuit 520 further comprises a MOS transistor M9 connected between node 700 and a node 704 of circuit 520. Transistor M9 has its conduction terminals coupled, preferably connected, to respective nodes 700 and 704. In this example, transistor M9 has an N channel and has its source connected to node 700 and its drain connected to node 704. The gate of transistor M9 is coupled to the input 526 of circuit 520. In other words, the gate of transistor M9 is configured to receive a control signal cmd4 determined by the signal received on the input 526 of circuit 520. A resistor R6 of circuit 520 couples node 704 to power supply node 514. Signal cmd4 is configured so that a first level of signal cmd4, for example, high, keeps transistor M9 saturated (conductive) and so that a second level of signal cmd4, for example, low, keeps transistor M9 non-conductive.

Preferably, transistors M8 and M9 have the same dimensions.

Preferably, resistors R5 and R6 are identical, that is, they have the same resistance values.

The node 704 of circuit 520 is coupled to the output 524 of circuit 520. In other words, the signal delivered by the output 524 of circuit 520 is determined by the signal on node 704.

Transistor M7 enables to bias a differential pair formed by transistors M8 and M9. Thus, according to the level of the signals in phase opposition present on inputs 522 and 526 of circuit 520, the current flowing through transistor M7 mainly flows through transistor M8 or through transistor M9. When the current mainly flows through transistor M8, the signal on node 702, respectively 704, is at a low, respectively high, level and, conversely, when the current mainly flows through transistor M9, the signal on node 702, respectively 704, is at a high, respectively low, level.

According to an embodiment, the gate of transistor M8 is coupled to input 522 by a circuit similar to the circuit 610 described in relation with FIG. 6, the gate of transistor M9 is coupled to input 526 by a circuit similar to the circuit 610 described in relation with FIG. 6 and, preferably, node 704 is coupled to output 524 by still another circuit similar to the circuit 610 described in relation with FIG. 6.

Circuit 520 comprises, for example, a capacitive element 706 coupling input 522 to the gate of transistor M8. For example, an electrode of capacitive element 706 is coupled, preferably connected, to input 522, the other electrode of capacitive element 706 being coupled, preferably connected, to the gate of transistor M8. Further, circuit 520 comprises, for example, a resistor R7 coupling the gate of transistor M8 to a node 707 of circuit 520, node 707 being configured to receive a DC voltage VDC2. For example, a terminal of resistor R7 is coupled, preferably connected, to the gate of transistor M8, the other terminal of resistor R7 being coupled, preferably connected, to node 707. Resistor R7 and capacitive element 706 form a circuit similar to the circuit 610 described in relation with FIG. 6, which couples input 522 to the gate of transistor M8.

Circuit 520 for example comprises a capacitive element 708 coupling input 526 to the gate of transistor M9. For example, an electrode of capacitive element 708 is coupled, preferably connected, to input 526, the other electrode of capacitive element 708 being coupled, preferably connected, to the gate of transistor M9. Further, circuit 520 for example comprises a resistor R8 coupling the gate of transistor M9 to the node 707 of circuit 520. For example, a terminal of resistor R8 is coupled, preferably connected, to the gate of transistor M9, the other terminal of resistor R8 being coupled, preferably connected, to node 707. Resistor R8 and capacitive element 708 form another circuit similar to the circuit 610 described in relation with FIG. 6, which couples input 526 to the gate of transistor M9.

Thus, voltage VDC2 sets the DC voltage on the gate of transistors M8 and M9. As an example, voltage VDC2 is determined so that transistor M8, respectively M9, operates in saturation (conductive) when signal cmd3, respectively cmd4, is at its first level, for example high, and so that transistor M8, respectively M9, is non-conductive when signal cmd3, respectively cmd4, is at its second level, for example, low.

Preferably, resistors R7 and R8 are identical and capacitive elements 704 and 708 are identical, that is, resistors R7 and R8 have a same resistance value and capacitive elements 704 and 708 have a same capacitance value.

Circuit 520 for example comprises a capacitive element 710 coupling node 704 to the output 524 of circuit 520. For example, an electrode of capacitive element 710 is coupled, preferably connected, to node 704, the other electrode of capacitive element 710 being coupled, preferably connected, to output 524. Further, circuit 520 for example comprises a resistor R9 coupling the output 524 of circuit 520 to a node 711 of circuit 520, node 711 being configured to receive a DC voltage VDC3. For example, a terminal of resistor R9 is coupled, preferably connected, to output 524, the other terminal of resistor R9 being coupled, preferably connected, to node 704. Resistor R9 and capacitive element 710 form still another circuit similar to the circuit 610 described in relation with FIG. 6, coupling node 704 to output 524.

Thus, voltage VDC3 sets the DC component on the output 524 of circuit 520.

In the example of FIG. 7, when the signals on inputs 522 and 526 respectively are in the high state and in the low state, the signal on output 524 is in the high state and, conversely, when the signals on inputs 522 and 526 respectively are in the low state and in the high state, the signal on output 524 is in the low state. In other examples, capacitive element 710 is connected to node 702 rather than to node 704, so that when the signals on inputs 522 and 526 are respectively in the high state and in the low state, the signal on output 524 is in the low state, and, conversely, when the signals on inputs 522 and 526 are respectively in the low state and in the high state, the signal on output 524 is in the high state. Thus, according to the considered example of circuit 520, the signal on output 524 is in phase or in phase opposition with the signal on input 522, which determines, for example, whether the first level of signal O1, respectively O2, is a high or low level.

Figure 8:
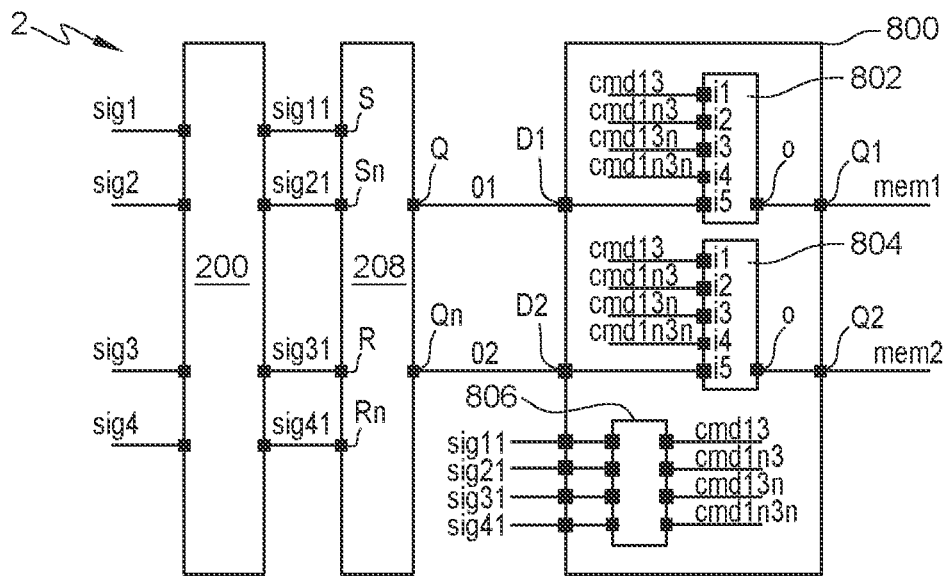
FIG. 8 shows in the form of blocks an alternative embodiment of the signal detection circuit of FIG. 2.

FIG. 8 shows in the form of blocks an alternative embodiment of the device 2 of FIG. 2.

The devices 2 of FIGS. 2 and 8 comprise many elements in common, and only the differences between these devices are here highlighted. More particularly, as compared with the device 2 of FIG. 2, the device 2 of FIG. 8 further comprises a writing and storage circuit 800.

Circuit 800 is implemented in CML, or, in other words, circuit 800 is a current mode logic writing or storage circuit.

Circuit 800 comprises an input D1 configured to receive signal O1, an input D2 configured to receive signal O2, an output Q1 configured to deliver an output signal mem1, and an output Q2 configured to deliver an output signal mem2.

Circuit 800 is configured so that the levels of signals mem1 and mem2, in the case in point square wave signals, are determined by the respective levels of signals O1 and O2 when signals sig11 and sig31 are simultaneously at their first levels, and are kept (stored) otherwise, that is, when one and/or the other of signals sig11 and sig31 is at its second level. In other words, when two signals sig11 and sig31 are simultaneously at their first levels, the level of signal mem1 is determined by the level of signal O1 and the level of signal mem2 is determined by the level of signal O2, otherwise the levels of signals mem1 and mem2 are kept at their current levels. Still in other words, when signals sig11 and sig31 are simultaneously at their first levels, circuit 800 is in a phase of writing of signals mem1 and mem2 based on signals, respectively O1 and O2, and in a storage phase otherwise.

The duration for which the level of signals O1 and O2 indicates which of signals sig1 and sig3 is the I signal is substantially equal to one quarter of the period of signals sig1 and sig3. Now, at frequencies greater than one GHz and capable of ranging up to 10 GHz, it may be difficult to observe the levels of signals O1 and O2 during this quarter of a period.

The provision of circuit 800 in device 2 enables for the levels of signals mem1 and mem2 to be constant and to be different according to whether signal sig1 is the I signal or whether signal sig3 is the I signal.

According to an embodiment, storage circuit 800 comprises a first flip-flop 802 and a second flip-flop 804. The two flip-flops 802 and 804 are implemented in CML, or, in other words, each flip-flop 802, 804 is a current mode logic flip-flop.

Flip-flop 802 is configured to receive signal O1 and deliver signal mem1, flip-flop 804 being configured to receive signal O2 and to deliver signal mem2. Preferably, flip-flops 802 and 804 are identical. For example, flip-flop 802, respectively 804, has an input i5 coupled, preferably connected, to the input D1, respectively D2, of circuit 800 and an output o coupled, preferably connected, to the output Q1, respectively Q2, of circuit 800.

Each flip-flop 802, 804 is further configured to receive at least one signal cmd13 indicating thereto when signals sig11 and sig31 are simultaneously at their first levels and when this is not the case.

According to an embodiment, each of flip-flops 802 and 804 receives a control signal cdm13, a control signal cmd1$n$3, a control signal cmd1$n$3$n$, and a control signal cmd13$n$. Signal cmd13 is configured to indicate when signals sig11 and sig31 are simultaneously at their first levels. Signal cmd1$n$3 is configured to indicate when signal sig11 and signal sig31 are simultaneously and respectively at the second level and at the first level. Signal cmd13$n$ is configured to indicate when signal sig11 and signal sig31 are simultaneously and respectively at the first level and at the second level. Signal cmd1$n$3$n$ is configured to indicate when signals sig11 and sig31 are simultaneously at their second levels. As an example, each of flip-flops 802 and 804 comprises an input i1 configured to receive signal cmd13, an input i2 configured to receive signal cmd1$n$3, an input i3 configured to receive signal cmd13$n$, and an input i4 configured to receive signal cmd1$n$3$n$.

According to an embodiment, circuit 800 comprises a current mode logic gate 806 configured to deliver signals cmd13, cmd1n3, cmd13n, and cmd1n3, for example based on at least signals sig11 and sig31, preferably based on signals sig11, sig21, sig31, and sig41.

According to an embodiment, logic gate 806 is configured to supply signals cmd13, cmd1n3, cmd13n, and cmd1n3n based on signals sig11, sig21, sig31, and sig41, and circuit 200 is configured to receive signals sig1, sig2, sig3, and sig4 and to supply signals sig11, sig21, sig31, and sig41, circuit 208 then being capable of comprising inputs Rn and Sn in addition to its S and R inputs.

According to an embodiment, logic gate 806 is configured to receive signals sig11, sig21, sig31, and sig41 and to generate signals cmd13, cmd1n3, cmd13n, and cmd1n3n based on these signals sig11, sig21, sig31, and sig41. According to an alternative embodiment where the circuit 520 of circuit 800 are implemented as described in relation with FIG. 7, logic gate 806 is configured to receive the signals of the nodes 702 and 704 of each of the two circuits 520, and to generate signals cmd13, cmd1n3, cmd13n, and cmd1n3n based on these signals.

Figure 9:
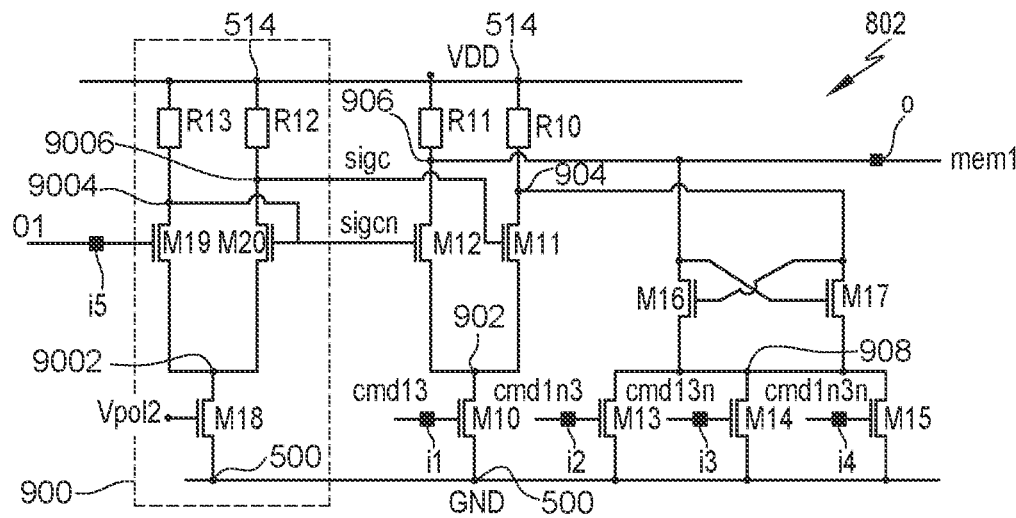
FIG. 9 shows an example of an embodiment of a portion of the circuit of FIG. 8.

FIG. 9 shows an example of an embodiment of the flip-flop 802 of the circuit 800 of FIG. 8.

Flip-flop 802 comprises a current mode logic circuit 900 configured to receive a square wave signal and to deliver a square wave signal sigc in phase with the received signal and a square wave signal sigcn in phase opposition with the received signal. In the example of FIG. 9, circuit 900 is configured to receive the signal O1 received by an input i5 of flip-flop 802, and is thus connected to this input i5.

Flip-flop 802 comprises a MOS transistor M10 connected between reference node 500 and a node 902 of the flip-flop. A gate of transistor M10 is configured to receive signal cmd13. For example, the gate of transistor M10 is coupled, preferably connected, to the input i1 of flip-flop 802. As an example, transistor M10 has an N channel and has its source coupled, preferably connected, to node 500 and its drain coupled, preferably connected, to node 902. Signal cmd13 is at a first level, preferably high, if signals cmd11 and cmd31 are simultaneously at their first levels, and at a second level, preferably low, otherwise.

Flip-flop 802 comprises a MOS transistor M11 connected between node 902 and a node 904 of flip-flop 802. A gate of transistor M11 is configured to receive the signal sigc delivered by circuit 900. As an example transistor M11 has an N channel and has its source coupled, preferably connected, to node 902 and its drain coupled, preferably connected, to node 904. Flip-flop 802 comprises a resistor R10 coupling node 904 to power supply node 514.

Symmetrically or complementarily, flip-flop 802 comprises a MOS transistor M12 connected between node 902 and a node 906 of flip-flop 802. A gate of transistor M12 is configured to receive the signal sigcn delivered by circuit 900. As an example, transistor M12 has an N channel and has its source coupled, preferably connected, to node 902 and its drain coupled, preferably connected, to node 906. Flip-flop 802 comprises a resistor R11 coupling node 906 to power supply node 514.

Preferably, resistors R10 and R11 are identical.

Preferably, transistors M11 and M12 have the same dimensions.

Transistor M10 for example enables to bias a differential pair comprising transistors M11 and M12 based on signal cmd13.

Flip-flop 802 further comprises transistors MOS M13, M14, and M15, each connected between node 500 and a node 908 of flip-flop 802. As an example, transistors M13, M14, and M15 have an N channel and all have their sources coupled, preferably connected, to node 500, and their drains coupled, preferably connected, to node 908. Preferably, transistors M13, M14, and M15 have the same dimensions, these dimensions being for example the same as those of transistor M10.

A gate of transistor M13 is configured to receive signal cmd1n3. For example, the gate of transistor M13 is coupled, preferably connected, to the input i2 of flip-flop 802. Signal cmd1n3 is at a first level, preferably high, if signals cmd11 and cmd31 are simultaneously and respectively at the second level and at the first level, and at a second level, preferably low, otherwise.

A gate of transistor M14 is configured to receive signal cmd13n. For example, the gate of transistor M14 is coupled, preferably connected, to the input i3 of flip-flop 802 configured to receive signal cmd13n. Signal cmd13n is at a first level, preferably high, if signals cmd11 and cmd31 are simultaneously and respectively at their first level and at their second level, and at a second level, preferably low, otherwise.

A gate of transistor M15 is configured to receive signal cmd1n3n. For example, the gate of transistor M15 is coupled, preferably connected, to the input i4 of flip-flop 802 configured to receive signal cmd1n3n. Signal cmd1n3n is at a first level, preferably high, if signals cmd11 and cmd31 are simultaneously at their second levels, and at a second level, preferably low, otherwise.

Flip-flop 802 further comprises two MOS transistors M16 and M17. Transistor M16 is connected between node 908 and node 906, and has its gate connected to node 904. Symmetrically, transistor M17 is connected between node 908 and node 904, and has its gate connected to node 906. Transistors M16 and M17 have, for example, the same dimensions.

Further, one of nodes 906 and 904, in this example node 906, is coupled, for example, connected, to the output o of flip-flop 802, configured to deliver the output signal mem1 of flip-flop 802.

According to an embodiment, circuit 900 comprises a MOS transistor M18 connected between reference node 500 and a node 9002 of circuit 900. Transistor M18 has a gate configured to receive a bias voltage Vpol2. As an example, MOS transistor M18 has an N channel and has its source coupled, preferably connected, to node 500 and its drain coupled, preferably connected, to node 9002. Circuit 900 further comprises a MOS transistor M19 connected between node 9002 and a node 9004 of circuit 900. As an example, MOS transistor M19 has an N channel and has its source coupled, preferably connected, to node 9002, and its drain coupled, preferably connected, to node 9004. The gate of the transistor M19 of flip-flop 802 is configured to receive signal O1 and is thus coupled, preferably connected, to the input i5 of flip-flop 802. A resistor R13 of circuit 900 couples node 9004 to power supply node 514. Complementarily or symmetrically, circuit 900 comprises a transistor M20 connected between node 9002 and a node 9006 of circuit 900. As an example, MOS transistor M20 has an N channel and has its source coupled, preferably connected, to node 9002, and its drain coupled, preferably connected, to node 9006. The gate of transistor M20 is coupled, preferably connected, to node 9004. A resistor R12 couples node 9006 to power supply node 514. Signal sigc, respectively sigcn, is available on the node 9006, respectively 9004, of circuit 900.

Although this is not illustrated, flip-flop 804 is identical to flip-flop 802, with the difference that the input i5 of flip-flop 804 receives signal O2 and that the output o of flip-flop 804 delivers signal mem2.

In an alternative embodiment, not illustrated, the transistors M13, M14, and M15 of each flip-flop 802, 804 are replaced with a single MOS transistor having its gate receiving a signal complementary to signal cmd13. However, this may result in the introduction of a shifting of the DC component on nodes 906 and 904 between the writing phase and the storage phase.

Figure 10:
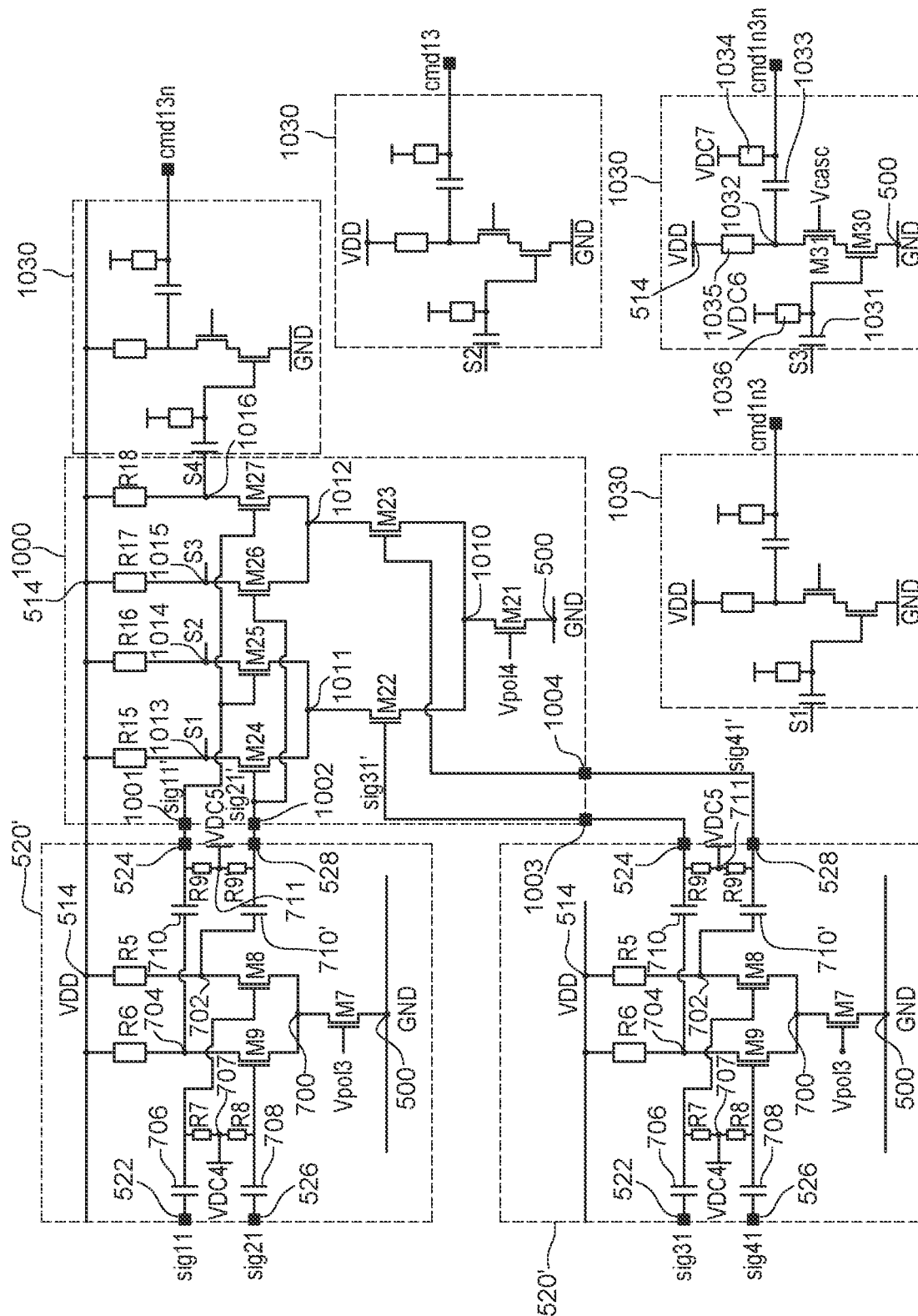
FIG. 10 shows an example of an embodiment of a portion of the circuit of FIG. 8.

FIG. 10 shows an example of an embodiment of the gate 806 of the circuit 800 of FIG. 8.

Logic gate 806 comprises a current mode logic NAND gate, bearing reference 1000 and delimited by dotted lines in FIG. 10. Gate 1000 is configured to receive four signals sig11', sig21', sig31', and sig41' determined by signals, respectively sig11, sig21, sig31, and sig41, and to deliver output signals S1, S2, S3, and S4.

According to an embodiment, gate 1000 comprises four inputs 1001, 1002, 1003, and 1004. Inputs 1001 and 1002 are configured to receive signals in phase opposition, for example, signals sig11' and sig21' in FIG. 10, inputs 1003 and 1004 being configured to receive two other signals in phase opposition, for example, signals sig31' and sig41' in FIG. 10. Further, gate 1000 comprises seven transistors MOS M21, M22, M23, M24, M25, M26, and M27. Transistor M21 is connected between node 500 and a node 1010, transistor M22 is connected between node 1010 and a node 1011, transistor M23 is connected between node 1010 and a node 1012, transistor M24 is connected between node 1011 and a node 1013, transistor M25 is connected between node 1011 and a node 1014, transistor M26 is connected between node 1012 and a node 1015, and transistor M26 is connected between node 1012 and a node 1016. The gate of transistors M22, M23, M24, M25, M26, and M27 are coupled, respectively connected, to the inputs, respectively 1003, 1004, 1002, 1001, 1002, and 1001 of gate 1000. Further, resistors R15, R16, R17, and R18 couple the respective nodes 1013, 1014, 1015, and 1016 to node 514. Signals S1, S2, S3, and S4 are available on respective nodes 1013, 1014, 1015, and 1016. The gate of transistor M21 receives a bias voltage Vpol4.

In the example illustrated in FIG. 10, gate 806 receives signals sig11, sig21, sig31, and sig41.

According to an embodiment, gate 806 then comprises two circuits 520' similar to the circuit 520 described in relation with FIG. 7. More particularly, each circuit 520' differs from the circuit 520 described in relation with FIG. 7 in that:
  circuit 520' further comprises an output 528;
  circuit 520' further comprises a capacitive element 710', for example, identical to capacitive element 710, coupling node 702 to output 528;
  circuit 520' further comprises a resistor R9', for example, identical to resistor R9, coupling output 528 to node 711;
  the bias voltage received by the gate of transistor M7 is a voltage Vpol3 that may be different from voltage Vpol1 (FIG. 7);
  the DC voltage received by node 707 is a voltage VDC4 that may be different from voltage VDC2 (FIG. 7); and
  the DC voltage received by node 711 is a voltage VDC5 that may be different from voltage VDC3 (FIG. 7).

In such an embodiment, the inputs 522 and 526 and the outputs 524 and 528 of a first one of the two circuits 520' are configured to receive signals sig11 and sig21 and to deliver signals sig11' and sig21', and the inputs 522 and 526 and the outputs 524 and 528 of a second one of the two circuits 520' are configured to receive signals sig31 and sig41 and to deliver signals sig31' and sig41'.

In an alternative embodiment (not illustrated), gate 806 comprises four circuits identical to the circuit 520 described in relation with FIG. 6, with the difference that the DC voltage received by the node 608 of each of these four circuits may be different from voltage VDC1 (FIG. 6). In this variant, a first one of these four circuits receives signal sig11 and delivers signal sig11', a second one of these four circuits receives signal sig21 and delivers signal sig21', a third one of these four circuits receives signal sig31 and delivers signal sig31', and a fourth one of these four circuits receives signal sig41 and delivers signal sig41'.

In another example not illustrated, gate 806 does not receive signals sig11, sig21, sig31, and sig41. According to an embodiment, gate 806 then receives the four signals available on the nodes 704 and 702 of the two circuits 520 of circuit 208 implemented as described in relation with FIG. 7. As an example, the four signals sig11', sig21', sig31', and sig41' then correspond to the four signals available on the nodes 704 and 702 of the circuits 520 of circuit 208 when these circuits 520 are implemented as described in relation with FIG. 7. In another example, signals sig11', sig21', sig31', and sig41' are obtained at the output of four circuits 520 which are implemented as described in relation with FIG. 6 and which are respectively connected to the nodes 704 and 702 of the two circuits 520 of circuit 208 when these two circuits 520 are implemented as described in relation with FIG. 7.

The transistors of gate 1000 for example have an N channel, whereby an output signal S1, S2, S3, S4 of gate 1000 is at a low level only when the two transistors which couple the node for delivering this signal S1, S2, S3, S4 to node 500 both receive signals at the high levels. Thus, in examples where: the first levels, respectively the second levels, of signals sig11, sig21, sig31, and sig41 are high, respectively low, levels; and signals sig11', sig21', sig31', and sig41' are in phase with signals sig11, sig21, sig31, and sig41, then when signals sig11 and sig31 are simultaneously at their first levels, signal S2 in the example of FIG. 10 is at its low level and the other signals S1, S3, and S4 all are at the high level. Referring again to FIG. 9, in the case where transistors M10 and M13 to M15 have an N channel, transistor M10 has to be conductive when the two signals sig11 and sig31 are at their high levels (first levels of signals sig11 and sig31) and transistors M13 to M15 then have to be non-conductive. It can thus be understood that signal S2 has to be inverted to obtain signal cmd13. Similarly, signals S1, S3, and S4 must be inverted to obtain signals cmd1n3, cmd13n, and cmd1n3n.

In other examples where the high and low level of at least certain signals are inverted with respect to what has been indicated hereinabove as an example, the inversions of at least certain signals S1, S2, S3, and S4 may be omitted.

In examples where signals S1, S2, S3, and S4 are inverted to obtain signals cmd13, cmd1n3, cmd13n, and cmd1n3n, gate 806 comprises four inverters 1030. Each inverter 1030 is configured to deliver an output signal having a level inverted with respect to the input signal of the inverter while keeping a difference (or dynamic range) between the high and low level of the output signal which is the same as that between the high and low levels of the input signal. Inverters 1030 are configured to receive signals S1, S2, S3, and S4 and to deliver signals cmd13, cmd1n3, cmd13n, and cmd1n3n.

For example, as shown in the example of FIG. 10, the inverter 1030 connected to node 1013 delivers signal cmd1n3, the inverter 1030 connected to node 1014 delivers signal cmd13, the inverter 1030 connected to node 1015 delivers signal cmd1n3n, and the inverter 1030 connected to node 10167 delivers signal cmd13n.

As an example, as illustrated for only one of inverters 1030 (at the bottom right in FIG. 10), each inverter 1030 comprises a capacitive element 1031 configured to receive the input signal on a first electrode and having its second electrode coupled, preferably connected, to the gate of a MOS transistor M30. Transistor M30 is connected between node 500 and a node 1032 of the inverter. For example, transistor M30 has a conduction terminal connected to node 500 and another conduction terminal coupled to node 1032 by a MOS transistor M31. Transistor M31 is cascode-assembled with transistor M30, and thus receives a bias voltage Vcasc on its gate. In another example, transistor M31 may be omitted. A capacitive element 1033 of inverter 1030 couples node 1032 to the output of the inverter. The inverter further comprises a resistor 1036 coupling the gate of transistor M30 to a DC voltage VDC6, a resistor 1035 coupling node 1032 to node 514, and a resistor 1034 coupling the inverter output to a voltage VDC7.

Various embodiments and variants have been described. Those skilled in the art will understand that certain features of these various embodiments and variants may be combined, and other variants will occur to those skilled in the art. In particular, device 2 may comprise, after circuit 800, a circuit configured to receive signals mem1 and mem2 and to deliver corresponding signals adapted to a processing by a CMOS circuit, that is, signals having their high and low levels substantially equal to the respective voltages VDD and GND.

In the present application, when it is indicated as an example that the first level of a square wave signal is a high, respectively low, level, those skilled in the art are capable of adapting the described embodiments and variants to other examples where the first level of this square wave signal is a low, respectively high, level.

Further, although examples of embodiment where the transistors have an N channel and voltage VDD is positive with respect to reference voltage GND have been described, those skilled in the art are capable of adapting the description which has been made to the case where voltage VDD is negative with respect to voltage GND, for example, by replacing all the N-channel transistors with P-channel transistors.

Finally, the practical implementation of the described embodiments and variations is within the abilities of those skilled in the art based on the functional indications given hereinabove. In particular, those skilled in the art are capable of determining the value of bias voltages Vpol1, Vpol2, Vpol3, Vpol4, and Vcasc and of DC voltages VDC1, VDC2, VDC3, VDC4, VDC5, VDC6, and VDC7 to obtain the operation described in relation with FIG. 2 or FIG. 8.

What is claimed is:

1. A device comprising:
   a first circuit having a first input to receive a first sine wave signal and a second input to receive a second sine wave signal in quadrature with respect to each other; and
   a current mode logic gate having a first input coupled to a first output of the first circuit and a second input coupled to a second output of the first circuit;
   wherein the first circuit is configured to deliver:
      a first square wave signal having a first level in the case that the first sine wave signal is positive with respect to its DC component and a second level otherwise; and
      a second square wave signal having a first level in the case that the second sine wave signal is positive with respect to its DC component and a second level otherwise,
   wherein the current mode logic gate is configured to deliver a third square wave signal and a fourth square wave signal,
   wherein the third square wave signal is at a first level and the fourth square wave signal is at a second level when the first and second square wave signals are simultaneously at their first levels and the first square wave signal is ahead of the second square wave signal, and
   wherein the third square wave signal is at a second level and the fourth square wave signal is at a first level when the first and second square wave signals are simultaneously at their first levels and the second square wave signal is ahead of the first square wave signal.

2. The device according to claim 1, wherein the first circuit comprises two identical conversion circuits, each conversion circuit comprising:
   an input node;
   an output node;
   an inverter having an output coupled to the output node;
   a resistor coupling an input of the inverter to the output of the inverter; and
   a capacitive element coupling the input node to the input of the inverter,
   wherein the input node and the output node of one of the two conversion circuits are configured to respectively receive the first sine wave signal and deliver the first square wave signal, and
   wherein the input node and the output node of the other one of the two conversion circuits are configured to respectively receive the second sine wave signal and deliver the second square wave signal.

3. The device according to claim 2, wherein each conversion circuit further comprises:
   a first switch in series with the resistor between the input and the output of the inverter; and
   a second switch coupling the input of the inverter to a voltage capable of forcing a given state of the output of the inverter when the second switch is on.

4. The device according to claim 1, wherein the current mode logic gate comprises:
   a reference node, a power supply node, a first node, a second node, a third node, a fourth node, a fifth node, and a sixth node;
   a first transistor coupled between the reference node and the first node and having a gate configured to receive a first control signal determined by the first square wave signal;
   a second transistor coupled between the first and second nodes and having a gate coupled to the third node;
   a first resistor coupling the second node to the power supply node;
   a third transistor coupled between the first and third nodes and having a gate coupled to the fourth node;
   a second resistor coupling the third node to the power supply node;
   a fourth transistor coupled between the reference node and the fifth node and having a gate configured to receive a second control signal determined by the second square wave signal;
a fifth transistor coupled between the fifth and fourth nodes and having a gate coupled to the sixth node;
a third resistor coupling the sixth node to the power supply node;
a sixth transistor coupled between the fifth and sixth nodes and having a gate coupled to the second node; and
a fourth resistor coupling the fourth node to the power supply node, the second and fourth nodes being configured to respectively deliver the third and fourth square wave signals.

5. The device according to claim 4, wherein the current mode logic gate further comprises two identical control circuits, each control circuit comprising an input and an output, each control circuit being configured to deliver, at its output, a square wave signal having an AC component determined by the AC component of a square wave signal received on its input and to set a DC component of the signal delivered on its output, a first one of the two control circuits being configured to receive the first square wave signal on its input and to deliver the first control signal on its output and a second one of the two control circuits being configured to receive the second square wave signal on its input and to deliver the second control signal on its output.

6. The device according to claim 5, wherein:
the first circuit is further configured to receive a third sine wave signal in phase opposition with the first sine wave signal and a fourth sine wave signal in phase opposition with the second sine wave signal; and
the first circuit is further configured to deliver:
a fifth square wave signal having a first level in the case that the third sine wave signal is positive with respect to its DC component and a second level otherwise; and
a sixth square wave signal having a first level in the case that the fourth sine wave signal is positive with respect to its DC component and a second level otherwise.

7. The device according to claim 6, wherein each of the two control circuits comprises:
an additional input,
a first node;
a second node;
a third node coupled to the output of the control circuit;
a first transistor coupled between the reference node and the first node of the control circuit and having a gate configured to receive a first bias voltage;
a second transistor coupled between the first and second nodes of the control circuit and having a gate coupled to the input of the control circuit;
a first resistor coupling the second node of the control circuit to the power supply node;
a third transistor coupled between the first and third nodes of the control circuit and having a gate coupled to the additional input of the control circuit; and
a second resistor coupling the third node of the control circuit to the power supply node,
wherein the additional input of a first of the two control circuits is configured to receive the fifth square wave signal, and
wherein the additional input of a second of the two control circuits is configured to receive the sixth square wave signal.

8. The device according to claim 7, wherein each control circuit further comprises:
a first capacitive element coupling the input of the control circuit to the gate of the second transistor of the control circuit;
a third resistor coupling the gate of the second transistor of the control circuit to a fourth node of the control circuit, the fourth node being configured to receive a first DC voltage;
a second capacitive element coupling the additional input of the control circuit to the gate of the third transistor of the control circuit;
a fourth resistor coupling the gate of the third transistor of the control circuit to the fourth node;
a third capacitive element coupling the third node of the control circuit to the output of the control circuit; and
a fifth resistor coupling the output of the control circuit to a fifth node of the control circuit, the fifth node being configured to receive a second DC voltage.

9. The device according to claim 1, wherein the device further comprises a current mode logic writing and storage circuit comprising:
a first input configured to receive the third square wave signal;
a second input configured to receive the fourth square wave signal;
a first output configured to deliver a first output signal; and
a second output configured to deliver a second output signal,
wherein the writing and storage circuit is configured so that a level of the first and second output signals is determined by the level, respectively, of the third and fourth square wave signals when the first and second square wave signals are simultaneously at their first levels, and to store the level of the first and second output signals otherwise.

10. The device according to claim 9, wherein:
the writing and storage circuit comprises a first current mode logic flip-flop and a second current mode logic flip-flop;
the first flip-flop is configured to receive the third square wave signal and deliver the first output signal; and
the second flip-flop is configured to receive the fourth square wave signal and deliver the second output signal.

11. The device according to claim 10, wherein each of the first and second flip-flops comprises:
a reference node, a power supply node, a first node, a second node, a third node, and a fourth node;
a current mode logic circuit configured to receive a signal and to deliver a signal in phase with the received signal and a signal in phase opposition with the received signal;
a first transistor coupled between the reference node and the first node, a gate of the first transistor being configured to receive a signal indicating when the first and second square wave signals are simultaneously at their first levels;
a second transistor coupled between the first and second nodes and having a gate configured to receive the signal in phase;
a first resistor coupling the second node to the power supply node;
a third transistor coupled between the first and second nodes and having a gate configured to receive the signal in phase opposition;
a second resistor coupling the third node to the power supply node;

fourth, fifth, and sixth transistors each coupled between the reference node and the fourth node;
a seventh transistor coupled between the fourth and second nodes and having a gate coupled to the third node; and
an eighth transistor coupled between the fourth and third nodes and having a gate coupled to the second node,
wherein a gate of the fourth transistor is configured to receive a signal indicating when the first and second square wave signals are simultaneously at their second levels,
wherein a gate of the fifth transistor is configured to receive a signal indicating when the first and second square wave signals are simultaneously and respectively at their first level and at their second level,
wherein a gate of the sixth transistor is configured to receive a signal indicating when the first and second square wave signals are simultaneously and respectively at their second level and their first level,
wherein the current mode logic circuit of the first flip-flop is configured to receive the third square wave signal,
wherein the current mode logic circuit of the second flip-flop is configured to receive the fourth square wave signal,
wherein one of the first and second nodes of the first flip-flop is configured to deliver the first output signal, and
wherein one of the first and second nodes of the second flip-flop is configured to deliver the second output signal.

12. The device according to claim 11, wherein each current mode logic circuit comprises:
a reference node, a power supply node, a first node, a second node, and a third node;
a first MOS transistor connected between the reference node and the first node and having a gate configured to receive a bias voltage;
a second MOS transistor connected between the first and second nodes and having a gate configured to receive the signal received by the current mode logic circuit;
a third MOS transistor connected between the first and third nodes and having a gate connected to the second node;
a resistor coupling the second node to the power supply node; and
another resistor coupling the third node to the power supply node,
wherein the second and third nodes are configured to respectively deliver the signals in phase opposition and in phase delivered by the current mode logic circuit.

13. The device according to claim 11, wherein the writing and storage circuit further comprises a current mode logic gate configured to deliver the received signal indicating when the first and second square wave signals are at their first levels, the signal indicating when the first and second square wave signals are at their second levels, the signal indicating when the first and second square wave signals are respectively at their first and second levels, and the signal indicating when the first and second square wave signals are respectively at their second and first levels.

14. The device according to claim 13, wherein:
the first circuit is further intended to receive a third sine wave signal in phase opposition with the first sine wave signal and a fourth sine wave signal in phase opposition with the second sine wave signal;
the first circuit is further configured to deliver a fifth square wave signal having a first level in response to the third sine wave signal being positive with respect to its DC component and a second level otherwise, and
the first circuit is further configured to deliver a sixth square wave signal having a first level in response to the fourth sine wave signal being positive with respect to its DC component and a second level otherwise; and
the current mode logic gate of the writing and storage circuit comprises:
a current mode logic NAND gate configured to receive four signals determined by respectively the first, second, fourth, and fifth square wave signals and to deliver first, second, third, and fourth output signals, and
four inverters configured to respectively receive the four output signals from the logic NAND gate and to respectively deliver the signal indicating when the first and second square wave signals are at their first levels, the signal indicating when the first and second square wave signals are at their second levels, the signal indicating when the first and second square wave signals are respectively at their first and second levels, and the signal indicating when the first and second square wave signals are respectively at their second and first levels.

15. The device according to claim 11, wherein:
the first circuit is further configured to receive a third sine wave signal in phase opposition with the first sine wave signal and a fourth sine wave signal in phase opposition with the second sine wave signal;
the first circuit is further configured to deliver a fifth square wave signal having a first level in response to the third sine wave signal being positive with respect to its DC component and a second level otherwise;
the first circuit is further configured to deliver a sixth square wave signal having a first level in response to the fourth sine wave signal being positive with respect to its DC component and a second level otherwise; and
the writing and storage circuit further comprises a current mode logic gate configured to receive the first, second, fifth, and sixth square wave signals and to deliver, based on the received signals, the signal indicating when the first and second square wave signals are at their first levels, the signal indicating when the first and second square wave signals are at their second levels, the signal indicating when the first and second square wave signals respectively are at their first and second levels, and the signal indicating when the first and second square wave signals respectively are at their second and first levels.

16. A device comprising: a first conversion circuit comprising a first input node, a first output node, a first inverter having an output coupled to the first output node, a first resistor coupling an input of the first inverter to the output of the first inverter, and a first capacitive element coupling the first input node to the input of the first inverter; a second conversion circuit comprising a second input node, a second output node, a second inverter having an output coupled to the second output node, a second resistor coupling an input of the second inverter to the output of the second inverter, and a second capacitive element coupling the second input node to the input of the second inverter; and a current mode logic gate having a first input coupled to the first output node and a second input coupled to the second output node, the current mode logic gate comprising: a reference node, a power supply node, a first node, a second node, a third node, a fourth node, a fifth node, and a sixth node; a first transistor having a current path coupled between the reference node and the first node and having a gate; a second transistor having a current path coupled between the first and second nodes and having a gate coupled to the third node; a first resistor coupling the second node to the power supply node; a third transistor having a current path coupled between the first and third nodes and having a gate coupled to the fourth node; a second resistor coupling the third node to the power supply node; a fourth transistor having a current path coupled between the reference node and the fifth node and having a gate; a fifth transistor having a current path coupled between the fifth and fourth nodes and having a gate coupled to the sixth node; a third resistor coupling the sixth node to the power supply node; a sixth transistor having a current path coupled between the fifth and sixth nodes and having a gate coupled to the second node; and a fourth resistor having a current path coupling the fourth node to the power supply node.

17. The device according to claim 16, wherein the first conversion circuit further comprises a first switch in series with the first resistor between the input and the output of the first inverter, and a second switch coupling the input of the first inverter to a voltage node, and wherein the second, conversion circuit further comprises a third switch in series with the second resistor between the input and the output of the second inverter, and a second switch coupling the input of the second inverter to the voltage node.

18. The device according to claim 16, wherein the current mode logic gate further comprises first and second control circuits, an output of the first control circuit being coupled to the gate of the first transistor and an output of the second control circuit being coupled to the gate of the fourth transistor.

19. The device according to claim 18, wherein the first and second control circuits each comprises:
an additional input,
a first node;
a second node;
a third node coupled to the output of the control circuit;
a first transistor coupled between the reference node and the first node of the control circuit and having a gate configured to receive a first bias voltage;
a second transistor coupled between the first and second nodes of the control circuit and having a gate coupled to the input of the control circuit;
a first resistor coupling the second node of the control circuit to the power supply node;
a third transistor coupled between the first and third nodes of the control circuit and having a gate coupled to the additional input of the control circuit; and
a second resistor coupling the third node of the control circuit to the power supply node.

20. The device according to claim 19, wherein the first and second control circuits each comprises:
a first capacitive element coupling the input of the control circuit to the gate of the second transistor of the control circuit;
a third resistor coupling the gate of the second transistor of the control circuit to a fourth node of the control circuit, the fourth node being configured to receive a first DC voltage;
a second capacitive element coupling the additional input of the control circuit to the gate of the third transistor of the control circuit;
a fourth resistor coupling the gate of the third transistor of the control circuit to the fourth node;

a third capacitive element coupling the third node of the control circuit to the output of the control circuit; and
a fifth resistor coupling the output of the control circuit to a fifth node of the control circuit, the fifth node being configured to receive a second DC voltage.

21. The device according to claim 16, further comprising a current mode logic writing and storage circuit comprising:
a first current mode logic flip-flop with an input coupled to a first output of the current mode logic gate; and
a second current mode logic flip-flop with an input coupled to a second output of the current mode logic gate.

22. The device according to claim 21, wherein each of the first and second flip-flops comprises:
a reference node, a power supply node, a first node, a second node, a third node, and a fourth node;
a flip-flop current mode logic circuit;
a first transistor having a current path connected between the reference node and the first node;
a second transistor having a current path connected between the first and second nodes;
a first resistor coupling the second node to the power supply node;
a third transistor having a current path connected between the first and second nodes;
a second resistor coupling the third node to the power supply node;
fourth, fifth, and sixth transistors each connected between the reference node and the fourth node;
a seventh transistor connected between the fourth and second nodes and having a gate connected to the third node; and
an eighth transistor connected between the fourth and third nodes and having a gate connected to the second node.

23. The device according to claim 22, wherein each flip-flop current mode logic circuit comprises:
a reference node, a power supply node, a first node, a second node, and a third node;
a first MOS transistor having a current path connected between the reference node and the first node and having a gate configured to receive a bias voltage;
a second MOS transistor having a current path connected between the first and second nodes and having a gate;
a third MOS transistor having a current path connected between the first and third nodes and having a gate connected to the second node;
a resistor coupling the second node to the power supply node; and
another resistor coupling the third node to the power supply node.

24. A method comprising:
receiving a first sine wave signal and a second sine wave signal in quadrature with respect to each other, the first and second sine wave signals each having a DC component;
generating a first square wave signal having a first level in the case that the first sine wave signal is positive with respect to its DC component and a second level otherwise;
generating a second square wave signal having a first level in the case that the second sine wave signal is positive with respect to its DC component and a second level otherwise; and
generating a third square wave signal and a fourth square wave signal, wherein the third square wave signal is at a first level and the fourth square wave signal is at a second level when the first and second square wave signals are simultaneously at their first levels and the first square wave signal is ahead of the second square wave signal, and wherein the third square wave signal is at a second level and the fourth square wave signal is at a first level when the first and second square wave signals are simultaneously at their first levels and the second square wave signal is ahead of the first square wave signal.

25. The method according to claim 24, wherein the third square wave signal switches from its first level to its second level only when the second square wave signal switches from its second level to its first level when the first square wave signal is at the first level, the third square wave signal then remaining at its second level only as long as the first and second square wave signals remain at their first levels, and wherein the fourth square wave signal switches from its first level to its second level only when the first square wave signal switches from its second level to its first level when the second square wave signal is at the first level, the fourth square wave signal then remaining at its second level only as long as the first and second square wave signals remain at their first levels.

26. The method according to claim 24, further comprising:

receiving a third sine wave signal in phase opposition with the first sine wave signal and a fourth sine wave signal in phase opposition with the second sine wave signal;

generating a fifth square wave signal having a first level in the case that the third sine wave signal is positive with respect to its DC component and a second level otherwise; and generating a sixth square wave signal having a first level in the case that the fourth sine wave signal is positive with respect to its DC component and a second level otherwise.

\* \* \* \* \*

UNITED STATES PATENT AND TRADEMARK OFFICE
CERTIFICATE OF CORRECTION

| | | |
|---|---|---|
| PATENT NO. | : 12,470,447 B2 | Page 1 of 1 |
| APPLICATION NO. | : 18/491212 | |
| DATED | : November 11, 2025 | |
| INVENTOR(S) | : Florence Giry-Cassan | |

It is certified that error appears in the above-identified patent and that said Letters Patent is hereby corrected as shown below:

In the Claims

In Column 29, Line 23, Claim 17:
Change "wherein the second, conversion circuit further comprises"
To --wherein the second conversion circuit further comprises--

Signed and Sealed this
Twenty-third Day of December, 2025

John A. Squires
*Director of the United States Patent and Trademark Office*